(12) United States Patent
Cheng et al.

(10) Patent No.: US 11,655,099 B2
(45) Date of Patent: *May 23, 2023

(54) HANDLING ROBOT

(71) Applicant: HAI ROBOTICS CO., LTD., Guangdong (CN)

(72) Inventors: Jui-chun Cheng, Guangdong (CN); Shengdong Xu, Guangdong (CN); Yuqi Chen, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,671

(22) Filed: Sep. 14, 2022

(65) Prior Publication Data

US 2023/0013220 A1 Jan. 19, 2023

Related U.S. Application Data

(63) Continuation of application No. 17/882,119, filed on Aug. 5, 2022, which is a continuation-in-part of (Continued)

(30) Foreign Application Priority Data

Nov. 14, 2017 (CN) .......................... 201711135812.7
Nov. 14, 2017 (CN) .......................... 201711141498.3

(51) Int. Cl.
*B65G 1/137* (2006.01)
*B65G 1/04* (2006.01)
(Continued)

(52) U.S. Cl.
CPC .......... *B65G 1/0435* (2013.01); *B25J 9/0009* (2013.01); *B25J 9/104* (2013.01); *B25J 9/1638* (2013.01);
(Continued)

(58) Field of Classification Search
CPC .... B65G 1/0435; B65G 1/0492; B65G 1/137; B65G 2203/0216; B65G 2203/041;
(Continued)

(56) References Cited

U.S. PATENT DOCUMENTS 1,068,317 A * 7/1913 Christy .................. B61D 17/12
52/49
3,549,025 A * 12/1970 Messner ................. B66F 9/141
187/360
(Continued)

FOREIGN PATENT DOCUMENTS

CH         680212 A5   7/1992
CN         2766681 Y   3/2006
(Continued)

OTHER PUBLICATIONS

The non-final office action of co-pending U.S. Appl. No. 17/651,328 which was dated May 26, 2022.
(Continued)

*Primary Examiner* — Kyle O Logan

(57) ABSTRACT

A method for retrieving an inventory item based on a handling robot, where the handling robot includes: a storage frame; and a material handling device installed on the storage frame, and including a telescopic arm and a manipulator installed to the telescopic arm; and the method for retrieving an inventory item includes: driving, by the telescopic arm, the manipulator to extend to a preset position of warehouse shelf along a preset horizontal reference line; loading, by the manipulator that is remained on the reference line, the inventory item located in the preset position; driving, by the telescopic arm, the manipulator loaded with the inventory item to move to the storage frame along the
(Continued)

reference line; and unloading, by the manipulator that is remained on the reference line, the inventory item to the storage frame.

30 Claims, 9 Drawing Sheets

Related U.S. Application Data application No. 17/862,579, filed on Jul. 12, 2022, which is a continuation-in-part of application No. 17/651,328, filed on Feb. 16, 2022, now Pat. No. 11,465,840, which is a continuation-in-part of application No. 17/385,811, filed on Jul. 26, 2021, which is a continuation of application No. 15/931,496, filed on May 13, 2020, now Pat. No. 11,104,514, which is a continuation of application No. PCT/CN2018/104654, filed on Sep. 7, 2018.

(51) Int. Cl.
| | | |
|---|---|---|
| B66F 9/06 | (2006.01) | |
| G06Q 10/08 | (2023.01) | |
| B25J 9/00 | (2006.01) | |
| B25J 9/10 | (2006.01) | |
| B25J 9/16 | (2006.01) | |
| B25J 13/08 | (2006.01) | |
| B25J 15/00 | (2006.01) | |
| G06T 7/70 | (2017.01) | |
| B25J 5/00 | (2006.01) | |

(52) U.S. Cl.
CPC .......... *B25J 9/1679* (2013.01); *B25J 9/1697* (2013.01); *B25J 13/08* (2013.01); *B25J 15/0014* (2013.01); *B65G 1/0492* (2013.01); *B65G 1/137* (2013.01); *B65G 1/1373* (2013.01); *B66F 9/063* (2013.01); *G06Q 10/08* (2013.01); *G06T 7/70* (2017.01); *B25J 5/007* (2013.01); *B65G 2203/0216* (2013.01); *B65G 2203/041* (2013.01)

(58) Field of Classification Search
CPC ........ B25J 9/0009; B25J 9/104; B25J 9/1638; B25J 9/1679; B25J 15/0014; B25J 5/007
See application file for complete search history.

(56) References Cited

U.S. PATENT DOCUMENTS

| 3,556,329 | A | * | 1/1971 | Johnston | C01B 21/1454 |
| | | | | | 414/663 |
| 3,727,778 | A | * | 4/1973 | Hollenbach | B66F 9/14 |
| | | | | | 414/277 |
| 4,458,808 | A | * | 7/1984 | Loomer | B66F 9/141 |
| | | | | | 198/750.1 |
| 4,941,794 | A | * | 7/1990 | Hara | B65G 67/20 |
| | | | | | 280/43.12 |
| 5,104,277 | A | * | 4/1992 | Bullock | G01R 31/2808 |
| | | | | | 414/280 |
| 7,320,385 | B2 | * | 1/2008 | Katae | B66F 9/0755 |
| | | | | | 187/222 |
| 7,336,177 | B2 | * | 2/2008 | Onderko | G06Q 10/08 |
| | | | | | 340/572.1 |
| 9,227,323 | B1 | * | 1/2016 | Konolige | G06T 19/003 |
| 9,701,471 | B2 | * | 7/2017 | Yamada | B65G 65/08 |
| 9,785,911 | B2 | * | 10/2017 | Galluzzo | B25J 5/007 |
| 10,370,201 | B2 | * | 8/2019 | Sonoura | B65G 61/00 |
| 10,613,533 | B1 | * | 4/2020 | Payson | G05D 1/0297 |
| 10,683,171 | B2 | * | 6/2020 | Jarvis | G05D 1/0225 |
| 10,803,420 | B2 | * | 10/2020 | Jarvis | G06Q 10/0875 |
| 10,815,055 | B2 | * | 10/2020 | Overfield | B65G 1/0435 |
| 10,894,663 | B2 | * | 1/2021 | Kapust | B65G 1/0492 |
| 10,957,569 | B2 | * | 3/2021 | Tawyer | H01L 21/67733 |
| 10,962,963 | B2 | * | 3/2021 | Zanger | B25J 9/1612 |
| 11,427,405 | B1 | | 8/2022 | Theobald | |
| 2003/0185656 | A1 | * | 10/2003 | Hansl | B65G 1/0435 |
| | | | | | 414/277 |
| 2004/0047714 | A1 | * | 3/2004 | Poli | H01L 21/67775 |
| | | | | | 414/281 |
| 2005/0047895 | A1 | * | 3/2005 | Lert | B65G 1/1378 |
| | | | | | 414/273 |
| 2006/0245862 | A1 | * | 11/2006 | Hansl | B66F 9/141 |
| | | | | | 414/281 |
| 2006/0248562 | A1 | * | 11/2006 | Kitsukawa | H04N 21/4622 |
| | | | | | 725/135 |
| 2008/0044262 | A1 | * | 2/2008 | Kim | B65G 1/0421 |
| | | | | | 414/281 |
| 2009/0162176 | A1 | * | 6/2009 | Link | B65G 1/0421 |
| | | | | | 414/659 |
| 2010/0316468 | A1 | * | 12/2010 | Lert | B65G 1/0485 |
| | | | | | 414/273 |
| 2013/0096713 | A1 | * | 4/2013 | Takizawa | B25J 15/0616 |
| | | | | | 700/224 |
| 2013/0209203 | A1 | * | 8/2013 | Rafols | B66F 9/07 |
| | | | | | 414/666 |
| 2014/0308098 | A1 | * | 10/2014 | Lert | B65G 1/065 |
| | | | | | 414/281 |
| 2015/0032568 | A1 | * | 1/2015 | Hellenbrand | G06Q 10/0836 |
| | | | | | 705/26.8 |
| 2015/0057793 | A1 | * | 2/2015 | Kawano | G06Q 10/087 |
| | | | | | 700/216 |
| 2015/0073589 | A1 | * | 3/2015 | Khodl | B65G 1/1375 |
| | | | | | 700/218 |
| 2016/0016311 | A1 | * | 1/2016 | Konolige | B25J 9/1664 |
| | | | | | 901/30 |
| 2016/0236867 | A1 | * | 8/2016 | Brazeau | B25J 5/007 |
| 2016/0305775 | A1 | | 10/2016 | Allen | |
| 2017/0032306 | A1 | * | 2/2017 | Johnson | G05D 1/0261 |
| 2017/0313512 | A1 | * | 11/2017 | Miyagawa | B65G 1/065 |
| 2017/0322561 | A1 | * | 11/2017 | Stiernagle | G07F 11/62 |
| 2017/0334644 | A1 | * | 11/2017 | Otto | B66F 9/07581 |
| 2018/0127211 | A1 | | 5/2018 | Jarvis | |
| 2018/0127212 | A1 | * | 5/2018 | Jarvis | B60P 1/00 |
| 2018/0305124 | A1 | | 10/2018 | Guo | |
| 2019/0061174 | A1 | * | 2/2019 | Robinson | B25J 15/0683 |
| 2022/0117806 | A1 | * | 4/2022 | King | A61G 5/1051 |

FOREIGN PATENT DOCUMENTS

| CN | 1791540 | A | 6/2006 |
| CN | 101397118 | A | 4/2009 |
| CN | 102825496 | A | 12/2012 |
| CN | 203229120 | U | 10/2013 |
| CN | 104619613 | A | 3/2014 |
| CN | 104619614 | A | 3/2014 |
| CN | 103723421 | A | 4/2014 |
| CN | 104777835 | A | 7/2015 |
| CN | 104837747 | A | 8/2015 |
| CN | 204588619 | U | 8/2015 |
| CN | 104875177 | A | 9/2015 |
| CN | 104966186 | A | 10/2015 |
| CN | 105600253 | A | 5/2016 |
| CN | 105705441 | A | 6/2016 |
| CN | 105752888 | A | 7/2016 |
| CN | 105774859 | A | 7/2016 |
| CN | 105775544 | A | 7/2016 |
| CN | 205438526 | U | 8/2016 |
| CN | 105945935 | A | 9/2016 |
| CN | 106005866 | A | 10/2016 |
| CN | 106044645 | A | 10/2016 |
| CN | 107667061 | A | 10/2016 |
| CN | 106081455 | A | 11/2016 |
| CN | 106276011 | A | 1/2017 |
| CN | 106379681 | A | 2/2017 |
| CN | 106426077 | A | 2/2017 |
| CN | 106429148 | A | 2/2017 |
| CN | 106882553 | A | 6/2017 |
| CN | 106892014 | A | 6/2017 |

(56) References Cited

FOREIGN PATENT DOCUMENTS

| | | |
|---|---|---|
| CN | 106927179 A | 7/2017 |
| CN | 206373907 U | 8/2017 |
| CN | 107226310 A | 10/2017 |
| CN | 206569571 U | 10/2017 |
| CN | 107336212 A | 11/2017 |
| CN | 108069180 A | 5/2018 |
| CN | 108122016 A | 6/2018 |
| CN | 108190341 A | 6/2018 |
| CN | 108217038 A | 6/2018 |
| CN | 108341201 A | 7/2018 |
| CN | 108383043 A | 8/2018 |
| CN | 108408316 A | 8/2018 |
| CN | 207684811 U | 8/2018 |
| CN | 209023571 U | 6/2019 |
| CN | 110498172 A | 11/2019 |
| DE | 2034834 A1 | 1/1972 |
| DE | 29808762 U1 | 11/1998 |
| DE | 102011002322 A1 | 10/2012 |
| DE | 102014007539 A1 | 11/2015 |
| DE | 102017219739 A1 | 5/2019 |
| EP | 0302205 A2 | 2/1989 |
| EP | 2008960 A2 | 12/2008 |
| EP | 2351698 A1 | 8/2011 |
| EP | 0634115 A1 | 9/2013 |
| EP | 2634115 A1 | 9/2013 |
| EP | 3192616 A1 | 7/2017 |
| GB | 2080265 A | 2/1982 |
| GB | 2336838 A | 11/1999 |
| JP | S505311 U | 1/1975 |
| JP | S6160504 A | 3/1986 |
| JP | H03152007 A | 6/1991 |
| JP | H06239410 A | 8/1994 |
| JP | H1111611 A | 1/1999 |
| JP | H1179321 A | 3/1999 |
| JP | 2003029837 A | 1/2003 |
| JP | 2006088235 A | 4/2006 |
| JP | 2008238959 A | 10/2008 |
| JP | 2010042921 A | 2/2010 |
| JP | 2011020794 A | 2/2011 |
| JP | 2012093278 A | 5/2012 |
| JP | 2013023320 A | 2/2013 |
| JP | 5413413 B2 | 2/2014 |
| JP | 2014051345 A | 3/2014 |
| JP | 2015124023 A | 7/2015 |
| KR | 101677497 B1 | 11/2016 |
| RU | 2404043 C1 | 11/2010 |
| SU | 867871 A1 | 9/1981 |
| SU | 1370017 A1 | 1/1988 |
| TW | 201643088 A | 12/2016 |
| WO | WO2011158422 A1 | 12/2011 |
| WO | WO2014034174 A1 | 3/2014 |
| WO | WO2016151505 A1 | 9/2016 |
| WO | WO2017044747 A1 | 3/2017 |
| WO | WO2017121747 A1 | 7/2017 |
| WO | WO2017205390 A2 | 11/2017 |
| WO | WO2018064639 A1 | 4/2018 |
| WO | WO2018064839 A1 | 4/2018 |
| WO | WO2018129738 A1 | 7/2018 |
| WO | WO2018140471 A1 | 8/2018 |
| WO | WO2019011276 A1 | 1/2019 |
| WO | WO2019095803 A1 | 5/2019 |

OTHER PUBLICATIONS

The notice of allowance of domestic counterpart U.S. Appl. No. 17/651,317 which was dated Jun. 17, 2022.
International Search Report of PCT patent application No. PCT/CN2018/104654 dated Dec. 14, 2018.

* cited by examiner

HANDLING ROBOT

CROSS-REFERENCE TO RELATED APPLICATIONS

This application is a continuation of U.S. patent application Ser. No. 17/882,119 filed on Aug. 5, 2022, which is a continuation-in-part of U.S. patent application Ser. No. 17/862,579 filed on Jul. 12, 2022, which is a continuation-in-part of U.S. patent application Ser. No. 17/651,328 filed on Feb. 16, 2022, which is a continuation-in-part of U.S. patent application Ser. No. 17/385,811 filed on Jul. 26, 2021, which is a continuation of U.S. patent application Ser. No. 15/931,496 filed on May 13, 2020, now patented as U.S. Pat. No. 11,104,514B2, which is a continuation of PCT/CN2018/104654 filed on Sep. 7, 2018, which in turn claims the priority benefits of Chinese Patent Applications No. 201711141498.3 and 201711135812.7, both filed on Nov. 14, 2017. The contents of the above identified applications are incorporated herein by reference in their entireties.

TECHNICAL FIELD

The present application relates to the field of intelligent warehousing technologies, and in particular, to a handling robot and a method for retrieving an inventory item based on the handling robot.

BACKGROUND

Intelligent warehousing is a link in the logistics process. The application of intelligent warehousing ensures the speed and accuracy of data input in all aspects of warehouse management of inventory items, thereby ensuring that an enterprise can grasp the real data of the inventory in a timely and accurate manner, and reasonably maintain and control inventory of the enterprise. It is also convenient to manage a batch, a shelf life, etc. of inventory items through scientific coding. Using a location management function, it is possible to grasp current location of all inventory items in time, which is conducive to improve an efficiency of warehouse management.

A handling robot plays an important role in intelligent warehousing. The handling robot replaces manual handling of the inventory items. However, in the process of implementing the present application, the inventor found that the quantity of the inventory items that can be loaded by an existing handling robot equipped with a shelf is too few and the efficient is low.

SUMMARY

To solve the above technical problems, embodiments of the present application provide a handling robot and a method for retrieving an inventory item based on the handling robot, which can load a large number of inventory items.

In order to solve the above technical problems, the embodiments of the present application provide the following technical solutions.

In a first aspect, there is provided a method for retrieving an inventory item based on a handling robot, where the handling robot includes a storage frame; a material handling device that is installed on the storage frame and includes a telescopic arm and a manipulator installed on telescopic arm; and the method for retrieving an inventory item includes: driving, by the telescopic arm, the manipulator to extend to a preset position of a warehouse shelf along a preset horizontal reference line; loading, by the manipulator that is remained on a horizontal plane where the reference line is located, an inventory item located at the preset position; driving, by the telescopic arm, the manipulator loaded with the inventory item to move to the storage frame along the reference line; unloading, by the manipulator that is remained on the horizontal plane where the reference line is located, the inventory item to the storage frame.

In some embodiments, the handling robot further includes: a lifting assembly installed between the storage frame and the material handling device; the method for retrieving an inventory item further includes: before the telescopic arm drives the manipulator to extend to the preset position of the warehouse shelf along the reference line, driving, by the lifting assembly, the material handling device to move in a vertical direction so that the manipulator horizontally faces to the preset position.

In some embodiments, the storage frame includes: a plurality of storage units distributed in the vertical direction; the method for retrieving an inventory item further includes: before the telescopic arm drives the manipulator loaded with the inventory item to move to the storage frame along the reference line, driving, by the lifting assembly, the material handling device to move in the vertical direction so that the material handling device horizontally faces to a corresponding storage unit.

In some embodiments, the handling robot further includes: a movable chassis equipped with the storage frame; the method for retrieving an inventory item further includes: before the lifting assembly drives the material handling device to move in the vertical direction so that the material handling device horizontally faces to the preset position, causing the movable chassis to move to a preset range in front of the warehouse shelf.

In some embodiments, the handling robot further includes: a detection device installed on the material handling device; the method for retrieving an inventory item further includes: before the telescopic arm drives the manipulator to extend to the preset position of the warehouse shelf along the reference line, and after the lifting assembly drives the telescopic arm to move in the vertical direction so that the material handling device horizontally faces to the preset position, detecting, by the detection device, position information of the material handling device relative to the inventory item, and adjusting, by the handling robot, a posture of fetching the inventory item according to the position information of the material handling device relative to the inventory item.

In some embodiments, the movable chassis can move along its travelling direction; the position information of the material handling device relative to the inventory item includes a first position offset between the inventory item and the reference line in the travelling direction; the adjusting, by the handling robot, a posture of fetching the inventory item according to the position information of the material handling device relative to the inventory item, includes: causing the movable chassis to move along the travelling direction according to the first position offset, so that the first position offset is smaller than a first error value.

In some embodiments, the position information of the material handling device relative to the inventory item includes a second position offset between the inventory item and the reference line in the vertical direction, the adjusting, by the handling robot, a posture of fetching the inventory item according to the position information of the material handling device relative to the inventory item, includes:

driving, by the lifting assembly, the material handling device to move in the vertical direction according to the second position offset, so that the second position offset is smaller than a second error value.

In some embodiments, the position information of the material handling device relative to the inventory item includes a distance between the inventory item and the manipulator along the reference line; the adjusting, by the handling robot, a posture of fetching the inventory item according to the position information of the material handling device relative to the inventory item, includes: adjusting an extension amount of the telescopic arm along the reference line according to the distance, so that the extension amount is larger than the distance.

In some embodiments, the detection device includes: an image acquisition device; when the image acquisition device acquires image information of the inventory item, the detection device detects the position information of the material handling device relative to the inventory item.

In some embodiments, a surface of the inventory item facing the handling robot is attached with a two-dimensional code label; when the image acquisition device acquires the image information of the inventory item, information provided by the two-dimensional code label is collected, to obtain the position information of the material handling device relative to the inventory item.

In some embodiments, the material handling device further includes: a temporary storage unit, the temporary storage unit being provided with the telescopic arm and the detection device; the method for retrieving an inventory item further includes: before the telescopic arm drives the manipulator loaded with the inventory item to move to the storage frame along the reference line, driving, by the telescopic arm, the manipulator loaded with the inventory item to retract to the temporary storage unit along the reference line; unloading, by the manipulator that is remained on the horizontal plane where the reference line is located, the inventory item to the temporary storage unit; and loading, by the manipulator that is remained on the horizontal plane where the reference line is located, the inventory item located on the temporary storage unit.

In some embodiments, the material handling device further includes: a fork comprising the telescopic arm, the temporary storage unit, the detection device and the manipulator; a support bracket installed on the storage frame; a rotation assembly installed between the fork and the support bracket; the method for retrieving an inventory item further includes: after the manipulator that is remained on the horizontal plane where the reference line is located loads the inventory item located on the temporary storage unit, and before the telescopic arm drives the manipulator loaded with the inventory item to move to the storage frame along reference line, driving, by the rotation assembly, the telescopic arm to rotate around the vertical direction to a preset angle, so that the material handling device is oriented towards the storage frame.

In some embodiments, the position information of the material handling device relative to the inventory item includes: a deflection amount between the inventory item and the reference line in a horizontal direction; the adjusting, by the handling robot, a posture of fetching the inventory item according to the position information of the material handling device relative to the inventory item includes: driving, by the rotation assembly, the fork to rotate around the vertical direction according to the second position offset, so that the deflection amount is smaller than a third error value.

In some embodiments, the handling robot further includes: a deflection detection device connected between the fork and the support bracket; the driving, by the rotation assembly, the fork to rotate around the vertical direction includes: when the deflection detection device detects that the fork has not yet rotated to the preset angle, driving, by the rotation assembly, the fork to continue to rotate; when the deflection detection device detects that the fork has rotated over the preset angle, driving, by the rotation assembly, the fork to rotate in a reverse direction; and when the deflection detection device detects that the fork rotates to the preset angle, causing the rotation assembly to stop rotating.

In some embodiments, the deflection detection device includes a first sensor provided with a first detection range; a second sensor provided with a second detection range; when the first sensor detects the fork in the first detection range, and the second sensor does not detect the fork in the second detection range, the deflection detection device detects that the fork has not yet rotated to the preset angle; when the first sensor does not detect the fork in the first detection range, and the second sensor detects the fork in the second detection range, the deflection detection device detects that the fork has rotated over the preset angle; and when the first sensor detects the fork in the first detection range, and the second sensor detects the fork in the second detection range, the deflection detection device detects that the fork rotates to the preset angle.

In some embodiments, the inventory item includes a first inventory item and a second inventory item; the preset position includes a first preset position and a second preset position, and the first inventory item is located at the first preset position, the second inventory item is located at the second preset position; the storage frame includes a first storage unit and a second storage unit; when there is the second inventory item back behind the first inventory item, the method for retrieving an inventory item further includes: driving, by the telescopic arm, the manipulator to extend to the first preset position of the warehouse shelf along the reference line; loading, by the manipulator that is remained on the horizontal plane where the reference line is located, the first inventory item located at the first preset position; driving, by the telescopic arm, the manipulator loaded with the first inventory item to move to the first storage unit; unloading, by the manipulator that is remained on the horizontal plane where the reference line is located, the first inventory item to the first storage unit; driving, by the telescopic arm, the manipulator to move to the second preset position of the warehouse shelf along the reference line; loading, by the manipulator that is remained on the horizontal plane where the reference line is located, the second inventory item located at the second preset position; driving, by the telescopic arm, the manipulator loaded with the second inventory item to move to the second storage unit along the reference line; and unloading, by the manipulator that is remained on the horizontal plane where the reference line is located, the second inventory item to the second storage unit.

In some embodiments, the method for retrieving an inventory item further includes: driving, by the telescopic arm, the manipulator to move to the first storage unit along the horizontal plane where the reference line is located; driving, by the telescopic arm, the manipulator to be remained on the horizontal plane where the reference line is located and to load the first inventory item located at the first storage unit; driving, by the telescopic arm, the manipulator loaded with the first inventory item to move to the first preset position of the warehouse shelf along the reference line; and unloading, by the manipulator that is remained along the reference line, the first inventory item to the first preset position of the warehouse shelf.

In an embodiment, the method for retrieving an inventory item further includes: driving, by the telescopic arm, the manipulator to move to the first storage unit along the reference line; driving, by the telescopic arm, the manipulator to be remained on the horizontal plane where the reference line is located, to load the first inventory item located at the first storage unit; driving, by the telescopic arm, the manipulator loaded with the first inventory item to move to the second preset position of the warehouse shelf along the reference line; and unloading, by the manipulator that is remained on the horizontal plane where the reference line is located, the first inventory item to the second preset position of the warehouse shelf.

In some embodiments, the method for retrieving an inventory item further includes: uploading current position information of the first inventory item.

Compared with the prior art, the present application provides a method for retrieving an inventory item based on a handling robot, where the handling robot includes: a storage frame; and a material handling device installed on the storage frame, the material handling device including a telescopic arm and a manipulator installed on the telescopic arm; the method for retrieving an inventory item includes: driving, by the telescopic arm, the manipulator to extend to a preset position of a warehouse shelf along a preset horizontal reference line; loading, by the manipulator that is remained along the reference line, the inventory item located at the preset position; driving, by the telescopic arm, the manipulator loaded with the inventory item to move to the storage frame along the reference line; unloading, by the manipulator that is remained along the reference line, the inventory item to the storage frame. The above method can realize moving the inventory item into the storage frame along the preset horizontal reference line, occupying a small space of the storage frame in the vertical direction, and loading a larger number of inventory items.

In a second aspect, there is provided a handling robot, including: a movable chassis; a storage frame, installed on the movable chassis, and provided with a plurality of storage units distributed in a vertical direction, each storage unit being configured to place an inventory item; a material handling device for transporting the inventory item between a warehouse shelf and any one of the storage units, the material handling device having a preset horizontal reference line, and comprising a pusher assembly that is movable relative to the storage frame along the reference line; and a lifting assembly for driving the material handling device to move in the vertical direction, so that any one of the storage units is located on the reference line; when one of the storage units is located on the reference line, the pusher assembly pushes the inventory item to a corresponding storage unit along the reference line, or the pusher assembly pulls the inventory item located at the corresponding storage unit away therefrom In some embodiments, the material handling device further includes a temporary storage unit; the temporary storage unit is configured to temporarily store an inventory item that is to be transported between the warehouse shelf and any one of the storage units, and the temporary storage unit has the reference line; when one of the storage units is located on the reference line, the pusher assembly may push an inventory item located on the temporary storage unit to a corresponding storage unit along the reference line, or the pusher assembly may pull an inventory item on a corresponding storage unit to the temporary storage unit.

In some embodiments, the material handling device further includes a telescopic arm.

The telescopic arm includes an outer arm section and an inner arm section, the outer arm section is fixedly installed to the temporary storage unit, and the inner arm section is installed to the outer arm section; the pusher assembly is installed to the inner arm section; the inner arm section can move relative to the outer arm section along the reference line, so that the pusher assembly can move relative to the storage frame along the reference line.

In some embodiments, the pusher assembly includes a manipulator; the manipulator is installed at an end of the inner arm section, so that the manipulator can move relative to the storage frame along the reference line, and the manipulator can unfold or fold relative to the inner arm section; when the manipulator folds relative to the inner arm section, an end of the inner arm section installed with the manipulator moves to another side from one side of the inventory item on the storage unit or the warehouse shelf that are located on the reference line, so that the manipulator unfolded relative to the inner arm section pulls a corresponding inventory item to the temporary storage unit.

In some embodiments, the pusher assembly further includes a fixed push rod; the fixed push rod is installed at an end of the inner arm section away from the manipulator, so that the fixed push rod can move relative to the storage frame along the reference line.

The fixed push rod is configured to push the inventory item placed on the temporary storage unit to the storage unit located on the reference line, or to push the inventory item placed on the temporary storage unit to an empty position of the warehouse shelf.

In some embodiments, the pusher assembly further includes a push rod driving device; the push rod driving device is connected to the manipulator, and is configured to drive the manipulator to rotate relative to the inner arm section, so that the manipulator can fold or unfold relative to the inner arm section.

In some embodiments, the telescopic arm further includes a middle arm section, a flat belt pulley, and an open-loop flat belt; the middle arm section is installed between the inner arm section and the outer arm section, and the middle arm section can move relative to the outer arm section along the reference line, and the inner arm section can move relative to the middle arm section along the reference line; the flat belt pulley is installed on the middle arm section; a middle part of the open-loop flat belt is arranged to be bent and sleeved over the flat belt pulley, so that both ends of the open-loop flat belt are oppositely arranged, one end being fixedly connected to the outer arm section, and the other end being fixedly connected to the inner arm section; when the middle arm section moves at a first speed relative to the outer arm section along the reference line, the inner arm section moves at a second speed relative to the outer arm section along the reference line, and the second speed is twice the first speed.

In some embodiments, the material handling device includes a support bracket, a fork, and a rotation assembly; the support bracket is installed on the movable chassis, and the lifting assembly is configured to drive the support bracket to move in the vertical direction; the fork includes the temporary storage unit, the telescopic arm and the pusher assembly; the rotation assembly includes a first rotating member and a second rotating member; the first rotating member is installed to the support bracket; the second rotating member is installed to the temporary storage unit, and can rotate in a vertically set rotation axis relative to the first rotating member, so that the fork can rotate around the rotation axis relative to the support bracket.

In some embodiments, the material handling device further includes a detection device; the detection device is configured to detect whether a corresponding warehouse shelf or storage unit is located on the reference line.

In some embodiments, the detection device includes an image acquisition device; the image acquisition device is configured to acquire image information of the inventory item to detect whether the corresponding warehouse shelf or storage unit is located on the reference line.

Compared with the prior art, in the handling robot of the embodiment of the present application, the handling robot includes: a movable chassis; a storage frame installed on the movable chassis, and provided with a plurality of storage units distributed in a vertical direction, each storage unit being configured to place an inventory item; a material handling device, configured to transport the inventory item between a warehouse shelf and any one of the storage units, having a preset horizontal reference line, and including a pusher assembly, the pusher assembly being movable relative to the storage frame along the reference line; a lifting assembly for driving the material handling device to move in a vertical direction, so that any one of the storage units is located on the reference line; when one of the storage units is located on the reference line, the pusher assembly can push the inventory item to a corresponding storage unit along the reference line, or pull an inventory item located on a corresponding storage unit away. An inventory item can be pushed into or pulled from the storage unit in the above manner, so that a distance between each two adjacent storage units is small, and more storage units can be placed in the handling robot with the same vertical height, increasing the maximum load capacity.

BRIEF DESCRIPTION OF DRAWINGS

One or more embodiments are exemplified by drawings corresponding to the embodiments. These exemplary descriptions do not constitute limitations on the embodiments. Elements with the same reference numerals in the drawings represent similar elements. Figures in the drawings are not drawn to scale unless otherwise stated.

DESCRIPTION OF EMBODIMENTS

In order to facilitate understanding of the present application, the present application will be described in more detail below with reference to the drawings and specific embodiments. It should be noted that when an element is expressed as "fixed" to another element, it may be directly on the another element, or there may be existed one or more intermediate elements therebetween. When an element is expressed as "connected" to another element, it may be directly connected to the another element, or there may be existed one or more intermediate elements therebetween. The terms "vertical", "horizontal", "left", "right", "inner", "outer", "first", "second", "third" and similar expressions used in the description of the present application are for illustrative purposes only. The term "connected" has the same meaning as the term "attached" or "coupled", and these terms are interchangeable. The term "install" has a same meaning as the term "mount", including a means of directly or indirectly installing. The term "indirectly installed or connected" means there may be existed one or more intermediate elements therebetween. The expression "A is fixedly installed or connected to B" means that "A is installed or connected to the B in an immovable way relative to B". The expression "A is connected or mounted to B" includes a means that "A may be movably connected or mounted to B", or a means that "A may be fixedly connected or mounted to B". The number in the "step 1", "step 2", . . . , "step N" used in the description of the present application is for illustrative purposes only, and it does not mean the unique or only order in which a process performs.

Unless otherwise defined, all technical and scientific terms used in the description of the present application have the same meaning as commonly understood by a person skilled in the art to which the present application pertains. The terms used in the description of the present application is only for the purpose of description of specific embodiments, and are not intended to limit the present application. The term "and/or" used in the description of the present application includes any and all combinations of one or more related items listed.

Figure 1:
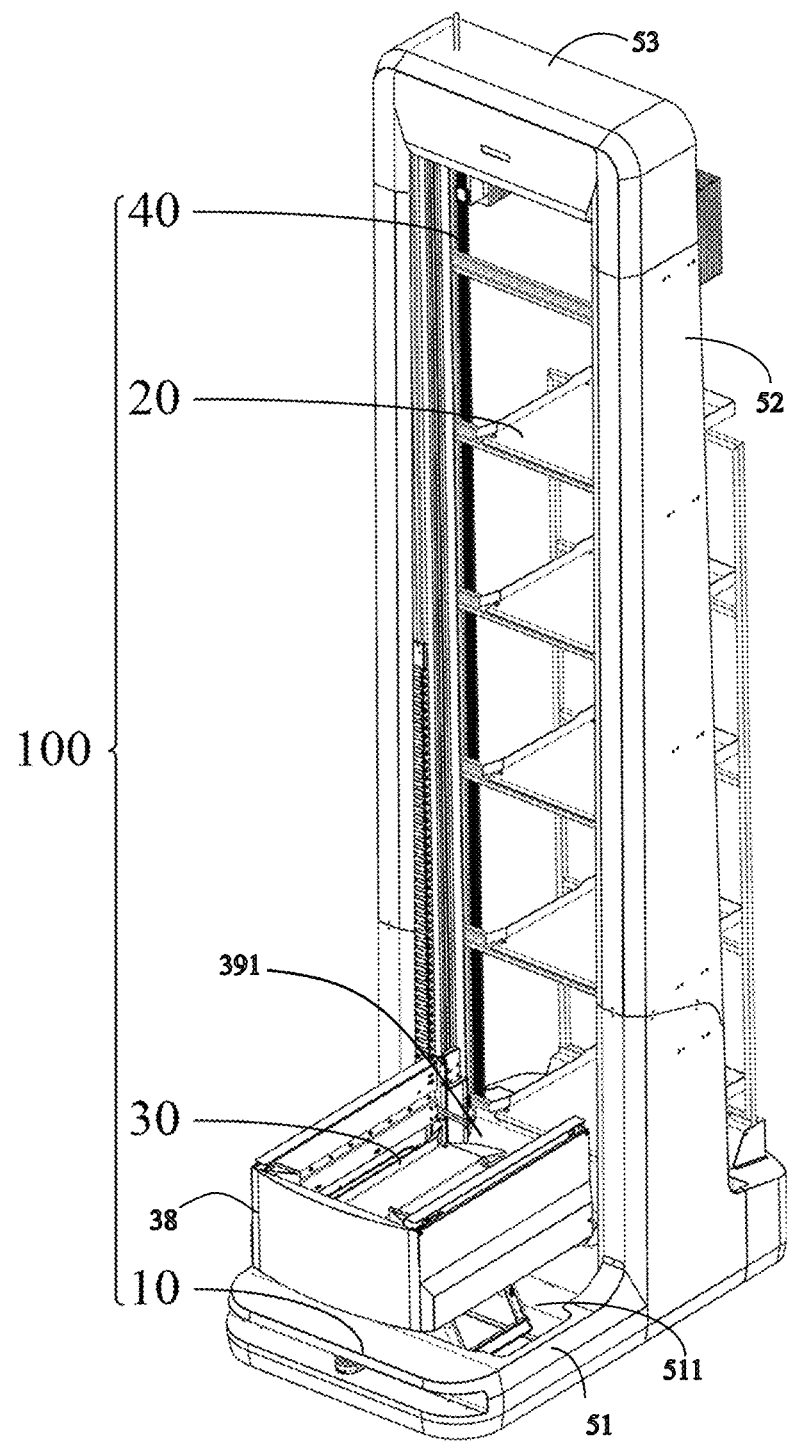
FIG. 1 is a schematic structural diagram of a handling robot according to an embodiment of the present application.
Figure 2:
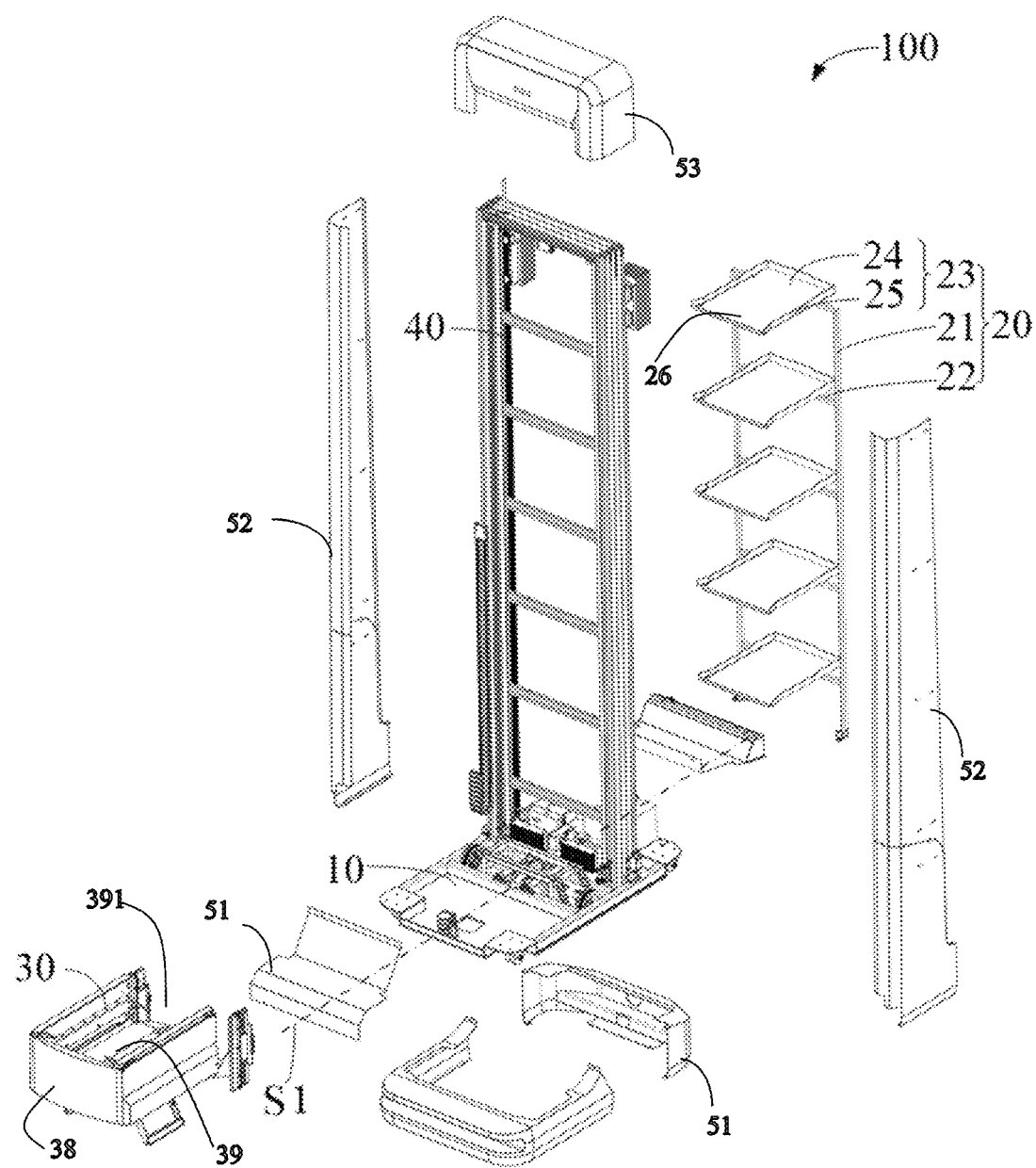
FIG. 2 is an exploded schematic diagram of the handling robot shown in FIG. 1.

Referring to FIGS. 1 and 2, an embodiment of the present application provides a handling robot 100, which can be applied to an intelligent warehousing system, an intelligent logistics system, or an intelligent sorting system, etc. In this embodiment, the handling robot 100 applied to the intelligent warehousing system will be taken as an example for detailed description.

The intelligent warehousing system is provided with a warehouse shelf, and the warehouse shelf is provided with a preset position for placing an inventory item. The preset position is located at a particular height. It should be noted that a management server may store a map which contains information about the particular height of the preset position. It should be understood that the shelf in embodiments of the present invention is usually stationary in a facility (e.g., a warehouse or a factory or distribution center) and may be a rack with multiple shelves or a rack with a single shelf. It will take the shelf which is provided in a warehouse as an example in the following description. However, the facility in which the shelf (shelves) is (are) disposed is not limited to the warehouse. The shelf or shelves may also be arranged in other facility, such as a factory. In some other embodiments, the shelf or shelves may also be provided on a ground of an outdoor area.

It should be noted that the inventory item may be a single object or multiple objects. It should be understood that the inventory item may be in the form of a container, a box, or a pallet, which contains or holds the single or multiple objects and may be pulled or pushed by the pusher assembly. However, it is not limited to the forms of the inventory item.

The handling robot 100 includes a movable chassis 10, a storage frame 20, a material handling device 30, and a lifting assembly 40. The storage frame 20, the material handling device 30 and the lifting assembly 40 are all installed to the movable chassis 10.

The movable chassis 10 is configured to realize a moving function of the handling robot 100.

Figure 3:
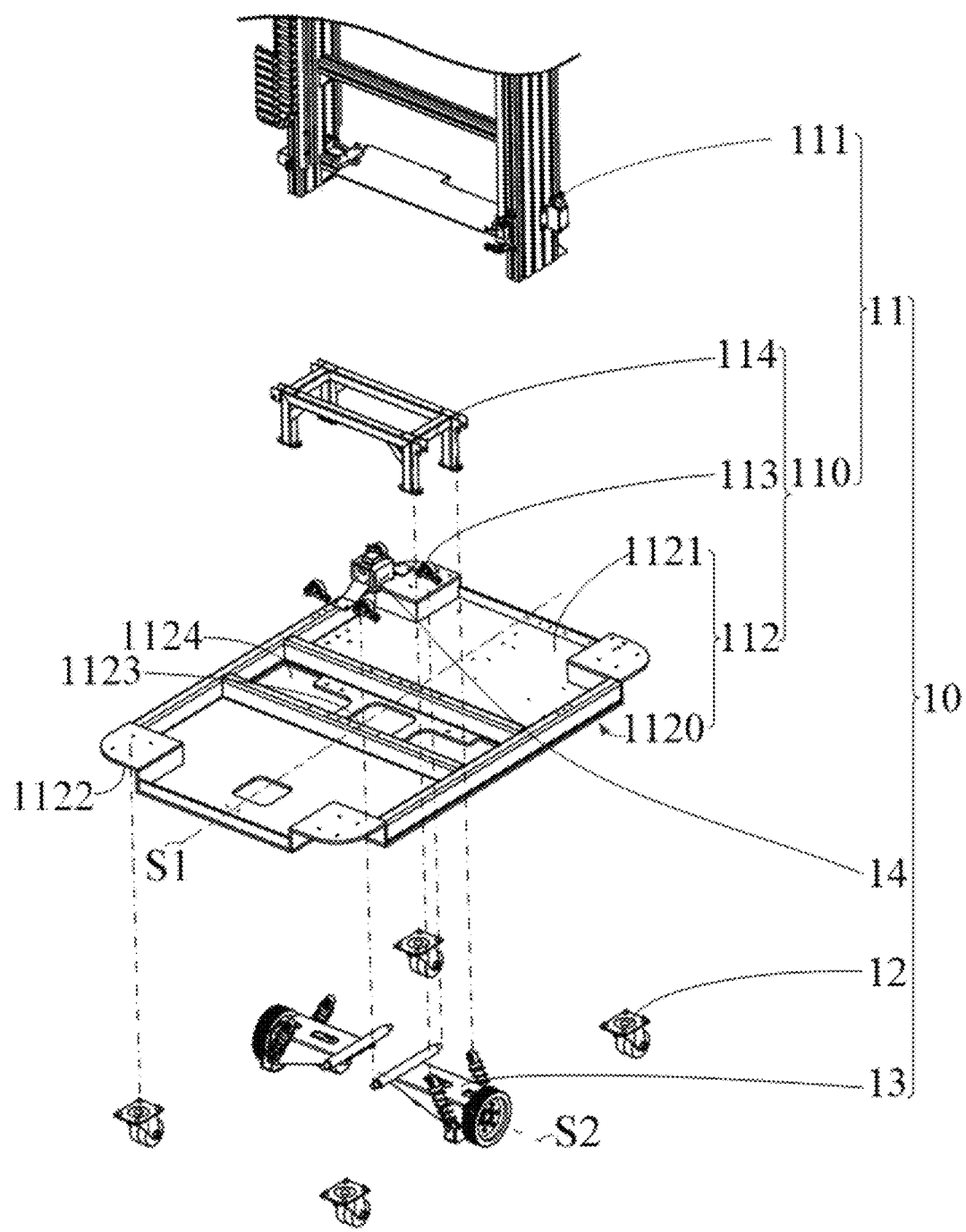
FIG. 3 is an exploded schematic diagram of a movable chassis of the handling robot shown in FIG. 2.

Refer to FIG. 3 together, the movable chassis 10 includes a bracket assembly 11, a driven wheel 12, a driving wheel assembly 13 and a guiding device 14. The driven wheel 12, the driving wheel assembly 13 and the guiding device 14 are all installed to the bracket assembly 11.

The bracket assembly 11 is assembled by welding a steel beam, a steel plate and a skin, and the bracket assembly 11 includes a base 110 and a standing frame 111. The standing frame 111 is installed to the base 110. There are many ways to install the standing frame 111. For example, the standing frame 111 may be installed directly or indirectly on the base 110 by fasteners, such as screwed nuts. The standing frame 111 may also be integrally formed with the base 110, and therefore installing on the base 110.

The base 110 includes a base body 112, a shaft seat 113, and a shock absorber bracket 114. The shaft seat 113 is installed to the base body 112, and the shock absorber bracket 114 is also installed to the base body 112.

The base body 112 is a horizontally arranged rectangular plate having a symmetrical axis S1, and the base body 112 includes a first surface 1120 and a second surface 1121 that are oppositely arranged. It can be seen from FIG. 3 that the first surface 1120 is a lower surface of the base body 112, and the second surface 1121 is an upper surface of the base body 112.

The base body 112 is provided with a driven wheel installation socket 1122, a driving wheel installation socket 1124, and a guiding device installation socket 1123.

The driven wheel installation socket 1122 is provided on a first surface 1120 of the base body 112, and is configured to install the driven wheel 12.

The driving wheel installation socket 1124 is arranged as penetrating through the first surface 1120 and the second surface 1121 of the base body 112, and the driving wheel installation socket 1123 is configured to accommodate the driving wheel assembly 13.

The guiding device installation socket 1123 is arranged as penetrating through the first surface 1120 and the second surface 1121 of the base body 112, and the guiding device installation socket 1123 is configured to install the guiding device 14.

The shaft seat 113 and the shock absorber bracket 114 are both installed to the second surface 1121 of the base body 112, and both the shaft seat 113 and the shock absorber bracket 114 are configured to install the driving wheel assembly 13 together.

It should be noted that, by providing the driven wheel installation socket 1122 for installing the driven wheel 12 and the driving wheel installation socket 1124 for accommodating the driving wheel assembly 13, a ground clearance and a centroid height of the movable chassis 10 can be controlled, so that the grip of the movable chassis 10 is improved, and the stability of movement of the movable chassis 10 is improved.

Refer to FIGS. 1 and 2, the base 110 includes a housing 51 configured to house at least one of the base body 112, the shaft seat 113, the shock absorber bracket 114, and the guiding device 14. It can be seen from FIG. 1 that a compartment 511 is formed by an upper surface of the housing 51, and at least a part of the material handling device 30 can be accommodated in the compartment 511 when the material handling device 30 is lowered to the lowest position. It is obvious from FIG. 1 that the compartment 511 is provided with a physical bottom surface. In an embodiment, the compartment 511 is not a through hole. The base body 112 is disposed beneath the physical bottom surface, as shown in FIGS. 1-2. When the handling robot is disposed on a ground (e.g., a floor of an indoor area in the warehouse), the physical bottom surface is over or above the ground. For example, the physical bottom surface is five centimeters above the ground. In an embodiment, the compartment 511 is provided with a cavity or a depression, as long as the bottom or lower surface of the compartment 511 is lower than a surrounding area. For example, as shown in FIG. 1, when the material handling device 30 is lowered to a particular height (e.g., the lowest height), a part of the bottom of the material handling device 30 is in the compartment 511. In this way, the material handling device 30 can drop to a lower position.

It should be noted that when the material handling device 30 is accommodated in the compartment 511, it is not required that the material handling device 30 is place on the compartment 511 or supported by the compartment 511. The lower part of the material handling device 30 is within a space enclosed by the compartment 511 when the material handling device 30 is lowered to the lowest position.

Figure 4:
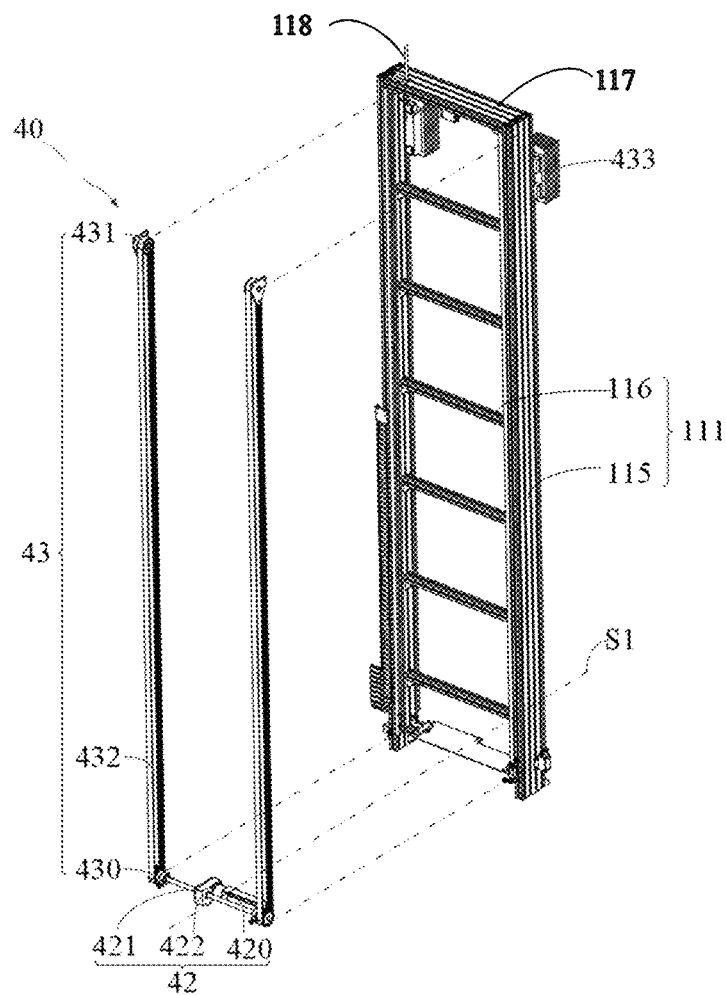
FIG. 4 is a schematic structural diagram of a standing frame and a lifting assembly of the handling robot shown in FIG. 2.

Refer to FIG. 4 together, the standing frame 111 is installed to the second surface 1121 of the base body 112. The standing frame 111 includes vertical columns 115 and horizontal columns 116 installed to the vertical columns 115.

The vertical columns 115 is vertically arranged and installed to the second surface 1121 of the base body 112. Two vertical columns are symmetrically distributed relative to a symmetrical axis S1.

A surface of each vertical column 115 facing another vertical column 115 is provided with a guide rail along a vertical direction. The material handling device 30 is installed to guide rails of the two vertical columns, so that the material handling device 30 can move relative to the vertical columns 115 along the vertical direction.

It should be understood that, according to an actual situation, the number of the guide rail is not limited to two. For example, the number of the guide rail may be one, three, or more than three, as long as there is at least one.

The horizontal columns 116 are horizontally arranged and are connected between two vertical columns 115. A plurality of horizontal columns 116 are distributed in a vertical direction.

In an embodiment, each of the horizontal columns 116 is integrally formed with the vertical columns 115. In some other embodiment, each of the horizontal columns 116 is fixedly attached to the vertical columns 115 by a fastener, such as a screwed nut.

As shown in FIG. 4, the standing frame 111 further includes a top horizontal bar 117 configured to connect the two vertical columns 115. A wireless communication unit 118 is provided on the top horizontal bar 117. The wireless communication unit 118 includes an antenna for receiving or sending wireless data. It can be seen from FIGS. 1 and 2 that the top horizontal bar 117 is, at least in part, enclosed by a housing 53.

As shown in FIGS. 1 to 4, each of the two vertical columns 115 is, at least in part, enclosed by a housing 52.

Four driven wheels 12 are distributed in a first rectangle, and one of symmetrical axes of the first rectangle coincides with the symmetrical axis S1. The four driven wheels 12 support the bracket assembly 11.

It should be understood that, according to an actual situation, the number of the driven wheel 12 is not limited to four, for example, the number of the driven wheel 12 may also be three, four or more than four, as long as there are at least three.

In this embodiment, the driven wheel 12 is a universal wheel.

It should be understood that, according to an actual situation, the driven wheel 12 is not limited to a universal wheel. For example, the driven wheel 12 may be a wheel body with a steering bracket (refer to a rear wheel set of an automobile), as long as the driven wheel 12 has a steering function.

The driving wheel assembly 13 is configured to drive the movable chassis 10 to move. The driving wheel assembly 13 is installed to the base 110. Two driving wheel assemblies 13 are symmetrically distributed relative to the symmetrical axis S1, and any one of the driving wheel assemblies 13 is located between two driven wheels 12.

Figure 5:
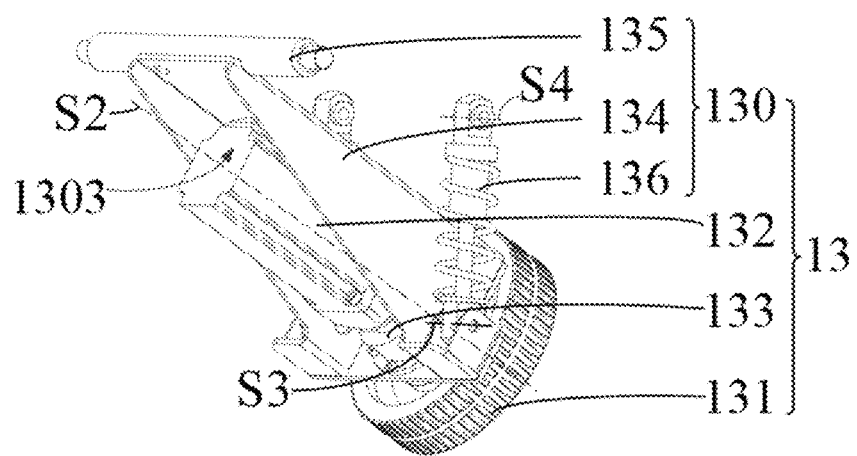
FIG. 5 is a schematic structural diagram of a driving wheel assembly of the movable chassis shown in FIG. 3.

Referring to FIG. 5 together, each driving wheel assembly 13 includes a driving wheel bracket 130, a driving wheel body 131, a hub driving device 132, and a hub reduction device 133. The driving wheel body 131 is installed to the driving wheel bracket 130, and the driving wheel body 131 can rotate around a rotation axis S2 relative to the driving wheel bracket 130. The rotation axis S2 is horizontal and perpendicular to the symmetrical axis S1, so that the movable chassis 10 can be movable. An output end of the hub driving device 132 is connected to an input end of the hub reduction device 133, and an output end of the hub reduction device 133 is connected to the driving wheel body 131 by a flange. The hub driving device 132 is configured to provide a first driving force for rotation of the driving wheel body 131 around the rotation axis S2. The hub reduction device 133 is configured to transmit the first driving force.

It should be understood that, according to an actual situation, the hub reduction device 133 may be omitted. In some embodiments, the output end of the hub driving device 132 is directly connected to the driving wheel body 131 by a flange, so that the driving wheel body 131 can rotate around the rotation axis S2.

It should be noted that the output end of the hub reduction device 133 or the output end of the hub driving device 132 is connected to the driving wheel body 131 by a flange, which can improve the reliability of the connection to the driving wheel body 131 and realize a stable installation of the driving wheel body 131, not easy to be detached.

The hub driving devices 132 of two driving wheel assemblies 13 are used to perform independent driving controls. Two driving wheel bodies 131 may have different rotational speeds, so that the movable chassis 10 turns toward a side of one driving wheel body 131 with a lower rotational speed, to realize a turning function of the movable chassis 10.

Furthermore, the driving wheel bracket 130 includes a hub bracket 134, an axle body 135, and a shock absorber 136. One end of the driving wheel bracket 130 is arranged near the first axis S1, and the other end is arranged away from the first axis S1. The driving wheel body 131 is installed to an end of the hub bracket 134 away from the symmetrical axis S1. The axle body 135 is connected to the hub bracket 134, and the axle body 135 is arranged to be parallel to the symmetrical axis S1. The axle body 135 is installed to the shaft seat 113 so that the driving wheel assembly 13 can rotate around the axle body 135 relative to the base body 112. One end of the shock absorber 136 is hinged to an end of the shock absorber bracket 114 away from the base body 112, so that the shock absorber 136 can rotate around the first axis S4 that is parallel to the axle body 135, relative to the base body 112; and the other end of the shock absorber 136 is hinged to an end of the hub bracket 134 away from the axle body 135, so that the shock absorber 136 can rotate around the second axis S3 that is parallel to the axle body 135, relative to the hub bracket 134. The shock absorber bracket 114, the hub bracket 134, and the shock absorber 136 form a triangular structure. When the movable chassis 10 turns, the shock absorber 136 can buffer a part of the eccentric force, to further improve the stability of movement of the movable chassis 10.

In this embodiment, the hub driving device 132 is a first motor.

It should be understood that, according to an actual situation, the hub driving device 132 is not limited to the first motor. For example, the hub driving device 132 may also be an air motor, a hydraulic transmission system, etc.

The guiding device 14 is installed to the second surface 1121 of the base body 131 through a guiding device bracket. In this embodiment, the guiding device 14 is a camera, and a lens of the camera is oriented toward the guiding device installation socket 1124, for identifying a two-dimensional code attached on the ground so that the movable chassis 10 travels along a preset path.

It should be understood that, according to an actual situation, the guiding device 14 is not limited to the camera. For example, the guiding device 14 may be a laser guiding device that travels along a laser beam. For another example, the guiding device 14 is a short wave receiving device, which realizes a guiding function by receiving a specific short wave signal, and so on.

Refer back to FIG. 2, the storage frame 20 includes a vertical pole 21, a horizontal pole 22 and a storage unit 23. The vertical pole 21 is vertically arranged and installed to the second surface 1121 of the base body 112. Two vertical poles 21 are symmetrically distributed relative to the symmetrical axis S1. The horizontal pole 22 is horizontally arranged and is connected between the two vertical poles 21. Both the number of the horizontal pole 22 and the number of the storage unit 23 correspond to the number of the horizontal column 116. One horizontal pole 22 and one corresponding horizontal column 116 support one corresponding storage unit 23, and each storage unit 23 is provided for accommodating an inventory item.

A vertical height of any one of horizontal poles 22 is lower than a vertical height of a corresponding horizontal column 116, so that a corresponding storage unit 23 inclines from a side at which the corresponding horizontal column 116 is located to a side at which a corresponding horizontal pole 22 is located, so that an inventory item placed in the storage unit is not easy to slip off from the side at which the horizontal column 116 is located.

Further, each storage unit 23 includes a plate body 24 and a surrounding plate 25. The plate body 24 are support jointly by the horizontal pole 22 and the horizontal column 116. The surrounding plate 25 is arranged around an edge of the plate body 24, and provides an opening 26 at a side near the horizontal column 116. The surrounding plate 25 can prevent an inventory item sliding off from the plate body 24, and the inventory item can be pushed into or pulled away from the plate body 24 through the opening 26. The material handling device 30 is configured to transport an inventory item between the warehouse shelf and any one of the storage units of the storage frame 20.

It should be noted that the number of the opening is not limited. In an embodiment, as shown in FIGS. 1-2, the plate body 24 is a plate with a flat upper surface, and each storage unit 23 has a single opening 26. In some other embodiment, the plate body 24 includes two plates spaced apart from each other. It may be possible that two openings are provided. For example, one opening is provided at a side near the horizontal column 116, and one opening is provided at a side away from the horizontal column. The inventory item can be pushed into or pulled away from the plate body 24 by the material handling device 30 through the opening near the horizontal column 116.

The structure or shape of the plate body 24 is not limited in the present invention, as long as the plate body 24 can support a weight of the inventory item. In an embodiment, as shown in FIGS. 1-2, the plate body 24 includes a flat upper surface. In some other embodiment, the upper surface of the plate body 24 is not flat. For example, the upper surface of the plate body 24 is rough and uneven.

In an embodiment, the plate body 24 is integrally formed with the horizontal column 116 supporting the plate body 24. In some other embodiments, the plate body 24 is fixedly attached on the horizontal column 116 supporting the plate body 24 by fasteners, such as screwed nuts.

In an embodiment, the vertical pole 21 and the horizontal pole 22 can be omitted. In an embodiment, each storage unit 23 is wholly supported by the corresponding horizontal column 116. In an embodiment, a storage unit 23 disposed at a lowest height is supported by both the horizontal column 116 and the housing 51, and other storage units 23 are wholly supported by the horizontal column 116.

The material handling device 30 can move along the vertical direction so that a position of the material handling device 30 is horizontally aligned with any one of the storage units. The material handling device 30 is configured to transport the inventory item between a preset position of the warehouse shelf and any one of the storage units.

It can be seen from FIGS. 1-4 that the storage frame 20 and the material handling device 30 are disposed at different sides of the vertical columns 115. For example, as shown in FIGS. 1-2, the two vertical columns 115 form a vertical plane. The material handling device 30 is disposed at a left side of the vertical plane, and the storage frame 20 is disposed at a right side of the vertical plane.

Figure 6:
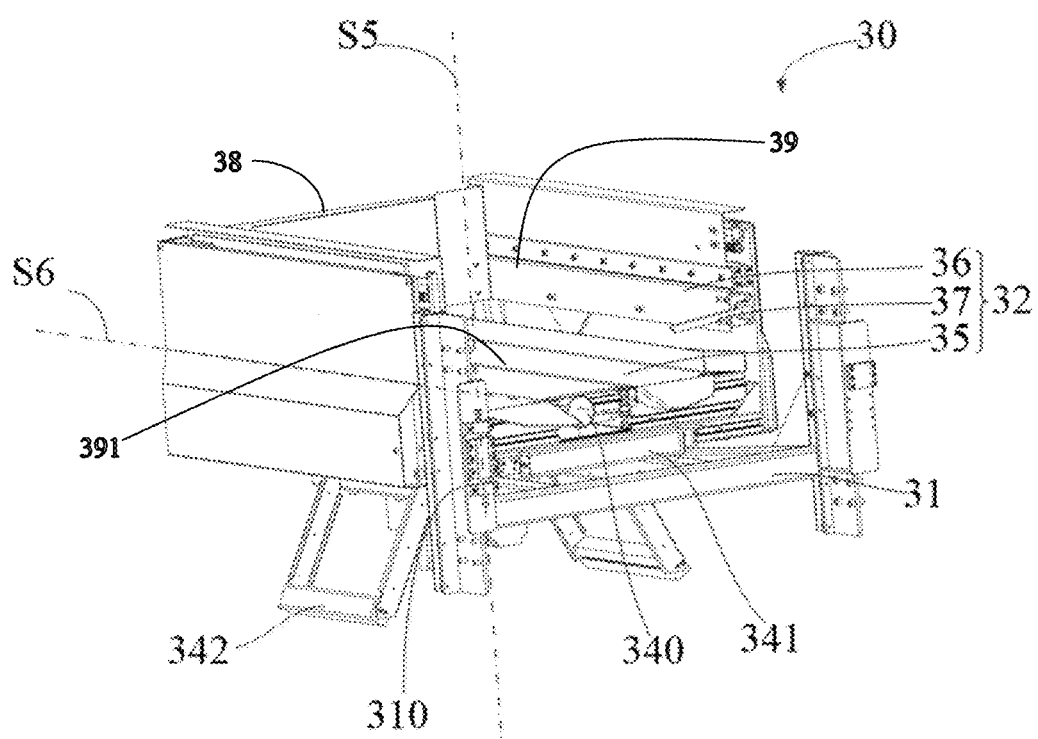
FIG. 6 is a schematic structural diagram of a material handling device of the handling robot shown in FIG. 2.
Figure 7:
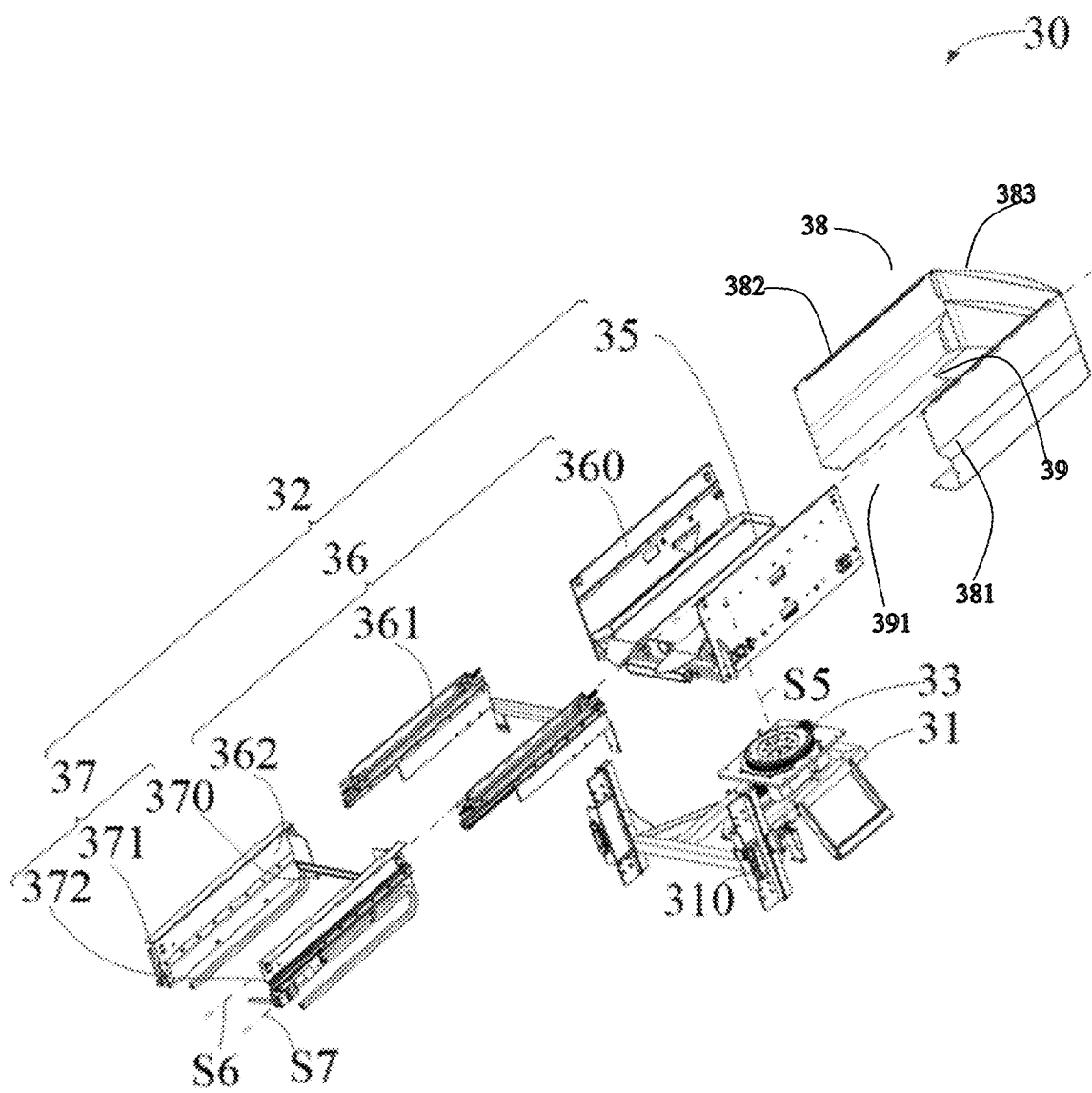
FIG. 7 is an exploded schematic diagram of the material handling device shown in FIG. 6.

Refer to FIGS. 6 and 7 together, the material handling device 30 includes a support bracket 31, a fork 32, a rotation assembly 33, and a detection device 34. The rotation assembly 33 is installed between the support bracket 31 and the fork 32, so that the fork 32 can rotate around a vertically set rotation axis S5 relative to the support bracket 31. The detection device 34 is configured to detect position information of the material handling device 30 relative to the inventory item.

The support bracket 31 is assembled by welding a steel beam and a steel plate, and is a horizontal arranged plate structure. An end of the support bracket 31 near the standing frame 111 is provided with a slide 310. Two slides 310 are symmetrically distributed relative to the symmetrical axis S1. Each slide 310 is installed to a corresponding guide rail, and moves along the guide rail. The fork 32 installed to the support bracket 31 moves along the vertical direction relative to the storage frame 20.

The fork 32 is configured to transport the inventory item between the preset position of the warehouse shelf and any one of the storage units. The fork 32 includes a temporary storage unit 35, a telescopic arm 36, and a pusher assembly 37. The temporary storage unit 35 has a reference line S6. The telescopic arm 36 is installed to the temporary storage unit 35, and is separated from the reference line S6 by a preset distance. The pusher assembly 37 is installed to the telescopic arm 36. The telescopic arm 36 drives the pusher assembly 37 to move in a direction parallel to the reference line S6. The components of the fork 32 are configured to rotate relative to the support bracket when the fork 32 rotates.

When the fork 32 moves along the vertical direction, any one of the storage units may locates on the reference line S6. In order to be aligned with the storage units, the fork 32 may move to a same height as any one of the storage units.

When one of the storage units is located on the reference line S6, the pusher assembly 37 may push the inventory item located on the temporary storage unit 35 to the corresponding storage unit 23 along the reference line S6, or the pusher assembly 37 may pull the inventory item on the corresponding storage unit 23 to the temporary storage unit 35.

In an embodiment, the pusher assembly 37 is further configured to pull the inventory item located on the warehouse shelf to the temporary storage unit 35, or push the inventory item located on the temporary storage unit 35 to a preset position of the warehouse shelf.

Figure 8:
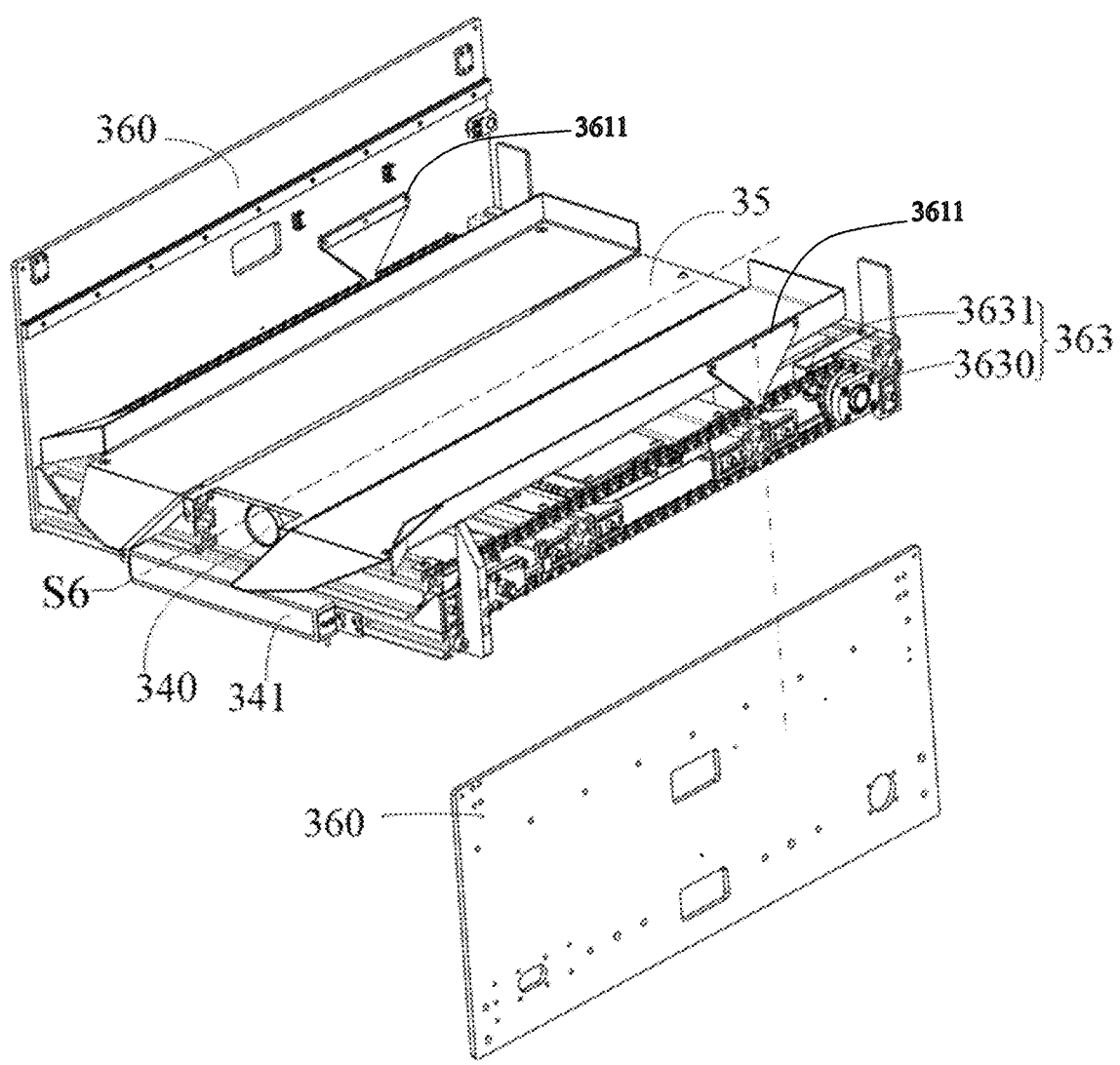
FIG. 8 is a structural schematic diagram of part of a fork of the material handling device shown in FIG. 7.

As shown in FIGS. 6-8, the telescopic arm 36 (or pusher assembly 37) is unable to lift relative to the temporary storage unit 35. The telescopic arm 36 (or pusher assembly 37) is liftable relative to the standing frame 111 via the support bracket 31. However, it should be understood that, according to an actual situation, in the process of transporting the inventory item on the warehouse shelf to the temporary storage unit 35, the fork 32 is not limited to using the pusher assembly 37 to pull the inventory item on the warehouse shelf to an upper surface of the temporary storage unit 35, or to push the inventory item on the upper surface of the temporary storage unit 35 to a preset position on the warehouse shelf. In some embodiments, the fork 32 further includes a pickup component for transporting the inventory item on the warehouse shelf to the temporary storage unit. For example, the pickup component clamps the inventory item on the warehouse shelf to the temporary storage unit 35 by clamping. For another example, the pickup component lifts the inventory item from the warehouse shelf to the temporary storage unit 35 by lifting, and so on.

The temporary storage unit 35 is a horizontally arranged rectangular plate structure with the reference line S6. The temporary storage unit 35 is configured to temporarily store an inventory item to be transported between the warehouse shelf and any one of the storage units 23.

For example, in the process of transporting the inventory item from the warehouse shelf to the storage frame 20, the fork 32 first transports the inventory item on the warehouse shelf to the temporary storage unit 35, and then the fork 32 transports the inventory item on the temporary storage unit 35 to any one of the storage units 23 of the storage frame 20. And vice versa, and due to word limitations, no description is repeated here.

It should be noted that, for the provision of the temporary storage unit 35, in a first aspect, it can transport an inventory item on one storage unit 23 to another storage unit 23, having a wide range of applications. In a second aspect, it can be realized that any storage unit 23 does not need to be located on the reference line S6 with the warehouse shelf at the same time, and there is no need for adaptive adjustment between the warehouse shelf and the storage frame 20, which makes the handling robot 100 has strong compatibility and can be adapted to different environments. Since there is no need to modify the warehouse shelf and the storage frame 20, the economy is better. In a third aspect, the temporary storage unit 35 can also store the inventory item for a long time, so that the maximum load capacity of the handling robot 100 is expanded.

Two telescopic arms 36 are symmetrically distributed relative to the reference line S6.

It should be understood that, according to an actual situation, the number of the telescopic arms 36 is not limited to two, for example, the number of the telescopic arm 36 may be one.

Each telescopic arm 36 includes an outer arm section 360, a middle arm section 361, an inner arm section 362, a middle arm section driving assembly 363, and an inner arm section driving assembly 364. The outer arm section 360 is installed to the temporary storage unit 35, and the middle arm section 361 is installed to the outer arm section 360. The middle arm section 361 can move relative to the outer arm section 360 along the reference line S6. The inner arm section 362 is installed to the middle arm section 361, and the inner arm section 362 can move relative to the middle arm section 361 along the reference line S6. The middle arm section driving assembly 363 is configured to drive the middle arm section 361 to move relative to the outer arm section 360 along the reference line S6, and the inner arm section driving assembly 364 is configured to drive the inner arm section 362 to move relative to the middle arm section 361 along the reference line S6.

When the telescopic arm 36 is compressed, the inner arm section 362 overlaps with the outer arm section 360.

When the telescopic arm 36 extends, the inner arm section 362 is separated from the outer arm section 360 in a direction along the reference line S6.

It should be understood that, according to an actual situation, the middle arm section 361 and the inner arm section driving assembly 364 may be omitted. In some embodiments, the inner arm section 362 is installed to the outer arm section 360, and the inner arm section 362 can move relative to the outer arm section 360 along the reference line S3. The middle arm section driving assembly 363 is configured to drive the inner arm section 362 to move relative to the outer arm section 360 along the reference line S6.

The middle arm section driving assembly 363 includes a sprocket wheel mechanism 3630 and a middle arm section driving device 3631. An output end of the middle arm section driving device 3631 is connected to a driving sprocket wheel of the sprocket wheel mechanism 3630. The middle arm section driving device 3631 is configured to drive the driving sprocket wheel to rotate. The middle arm section 361 is fixedly connected to a roller chain of the sprocket wheel mechanism 3630, and the sprocket wheel mechanism 3630 can drive the middle arm section 361 to move relative to the outer arm section 360 along the reference line S6.

As shown in FIG. 8, the middle arm section 361 includes a connecting plate 3611. The connecting plate 3611 is fixedly connected to a roller chain of the sprocket wheel mechanism 3630. The sprocket wheel mechanism 3630 can drive the middle arm section 361 through the connecting plate 3611 to move relative to the outer arm section 360.

It should be understood that, according to an actual situation, the sprocket wheel mechanism 3630 may be replaced with a pulley mechanism or the like.

The middle arm section driving device 3631 is a second motor.

It should be understood that, according to an actual situation, the middle arm section driving device 3631 is not limited to a motor. For example, the middle arm section driving device 3631 may also be an air motor, a hydraulic transmission system, or the like.

Figure 9:
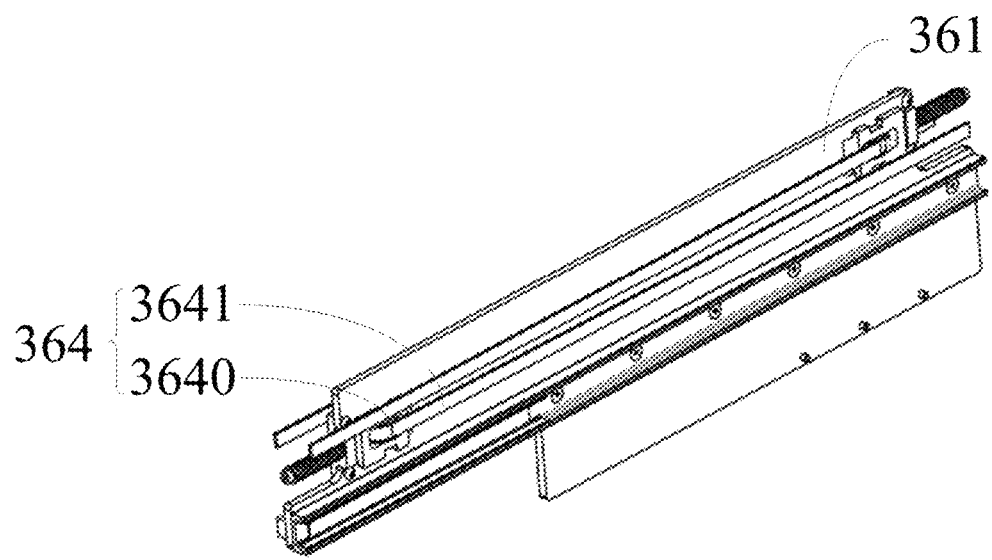
FIG. 9 is a schematic structural diagram of a middle arm section and an inner arm section driving assembly of the fork shown in FIG. 8.

Refer to FIG. 9 together, the inner arm section driving assembly 364 includes a movable pulley 3640 and a strop 3641. The movable pulley 3640 is installed to the middle arm section 362. A middle part of the strop 3641 is arranged to be bent so that two ends of the strop 3641 are oppositely arranged, that is, the strop 3641 is U-shaped, and the middle part of the strop 3641 is sleeved over the movable pulley 3640. One end of the strop 3641 is fixedly connected to the outer arm section 360, and the other end of the strop 3641 is fixedly connected to the inner arm section 362. The movable pulley 3640 and the strop 3641 form a movable pulley structure. When the middle arm section 361 moves at a first speed relative to the outer arm section 360 along the reference line S6, the inner arm section 362 moves at a second speed relative to the outer arm section 360 along the reference line S6, the second speed is twice the first speed.

In some scenario, a single middle arm section 361 is provided. However, it should be understood that the telescopic arm 36 may include two or more middle arm section 361. For example, two middle arm sections 361 are provided, where an end of a first middle arm section 361 is movably connected to the outer arm section 360 and another end of the first middle arm section 361 is movably connected to a second middle arm section 361. The second middle arm section 361 is then movably connected to the inner arm section 362.

In this embodiment, the movable pulley 3640 is a flat belt pulley, and the strop 3641 is an open-loop flat belt.

It should be understood that, according to an actual situation, the movable pulley 3640 and the strop 3641 are not limited to the flat belt pulley and the open-loop flat belt. In some embodiments, the movable pulley 3640 is a sprocket wheel, and strop 3641 is a roller chain.

The pusher assembly 37 includes a fixed push rod 370, a manipulator 371, and a push rod driving device 372. In an embodiment, two ends of the fixed push rod 370 are respectively fixedly installed at opposite ends of the two inner arm sections 362, and two manipulators 371 are respectively installed at ends of the inner arm sections 362 away from the fixed push rod 370. The manipulators 371 can fold or unfold relative to the inner arm sections 362. The push rod driving device 372 is configured to drive the manipulators 371 to fold or unfold relative to the inner arm sections 362.

In some other embodiment, the pusher assembly 37 includes two fixed push rods symmetrically disposed relative to the reference line S6, and each fixed push rod is fixedly installed to a corresponding inner arm section 362.

When the telescopic arm 36 is in a compressed state, the temporary storage unit is located between the two ends of the inner arm section 362 in a direction along the reference line S6.

When the telescopic arm 36 is in an extension state, an end of the inner arm section 362 installed with the fixed push rod 370 is close to the temporary storage unit, and an end of the inner arm section 362 installed with the manipulator 371 is away from the temporary storage unit.

In an embodiment, the push rod driving device 372 includes a third motor, and an end of the manipulator 371 is installed at an output end of the third motor. The third motor is configured to drive the manipulator 371 to rotate relative to the inner arm section 362 around the third axis S7 that is parallel to the reference line S6, so that the manipulator 371 unfolds or folds relative to the inner arm section 362.

When the manipulator 371 folds to the inner arm section 362, and an inventory item is located on the reference line S6, the end of the inner arm section 362 installed with the manipulator 371 can move from a side of the corresponding inventory item facing the temporary storage unit to a side of the inventory item away from the temporary storage unit along the reference line S6, so that the manipulator 371 relative to the inner arm section 362 may pull the inventory item to the temporary storage unit along the reference line S6.

It should be noted that if an inventory item is located on the reference line S6, the inventory item is aligned with the material handling device. The so-called inventory item may be an inventory item on the warehouse shelf or an inventory item on the storage unit, as long as the inventory item is located on the reference line S6.

When the warehouse shelf is located on the reference line S6, the fixed push rod 370 can push the inventory item located on the temporary storage unit 35 to a preset position of the warehouse shelf. It should be noted that in an embodiment, when the warehouse shelf is located on the reference line S6, the material handling device 30 is at a same height as the warehouse shelf.

Similarly, when one storage unit 23 is located on the reference line S6, the fixed push rod can push the inventory item that is temporarily stored on an upper surface of the temporary storage unit 35 to a corresponding storage unit 23 along the reference line S6. It should be noted that in an embodiment, when one storage unit 23 is located on the reference line S6, the material handling device 30 is at a same height as the storage unit 23.

It should be understood that, when the fixed push rod 370 pushes the inventory item, the manipulator 371 can fold relative to the inner arm section 362 or unfold relative to the inner arm section 362. When the fixed push rod 370 completes the pushing of the inventory item and is reset, the manipulator 371 folds relative to the inner arm section 362.

It should be understood that, according to an actual situation, the temporary storage unit 35 can be omitted.

The temporary storage unit 35 has basically the same structure as the storage unit 23 or the warehouse shelf, and at the position of the temporary storage unit 35, the temporary storage unit 35 can be directly replaced with the storage unit 23.

In some embodiments, each storage unit 23 is located on the same horizontal plane as a corresponding warehouse shelf. When one storage unit 23 and the preset positions of one warehouse shelf are both on the reference line S6, the fixed push rod 370 may push the inventory item placed on the corresponding storage unit 23 to the preset position of the corresponding warehouse shelf, or the manipulator 371 unfolded relative to the inner arm section 362 pulls the inventory item located on the corresponding warehouse shelf to the corresponding storage unit 23.

In some embodiments, the fixed push rod 370 may be omitted. Specifically, the manipulator includes a pushing surface and a pulling surface, which are oppositely arranged. The pushing surface is oriented toward one end of the reference line, and the pulling surface is oriented toward the other end of the reference line. The inner arm section 362 installed with the manipulator 371 can move to either side of the inventory item (located on the temporary storage unit, the storage unit, or the warehouse shelf) by the manipulator 371 folded relative to the inner arm section 362, and the manipulator 371 unfolded relative to the inner arm section 362 can push the inventory item to the temporary storage unit 35, the storage unit 23 or the preset position of the warehouse shelf via the pushing surface, or pull the inventory item to the temporary storage unit 35, the storage unit 23 or the preset position of the warehouse shelf via the pulling surface.

The rotation assembly 33 is configured to rotate the fork 32 relative to the storage frame 20 around a vertical direction, so that any two or three of any storage unit 23, the warehouse shelves and the reference line S6 may not be located in the same vertical plane.

Figure 10:
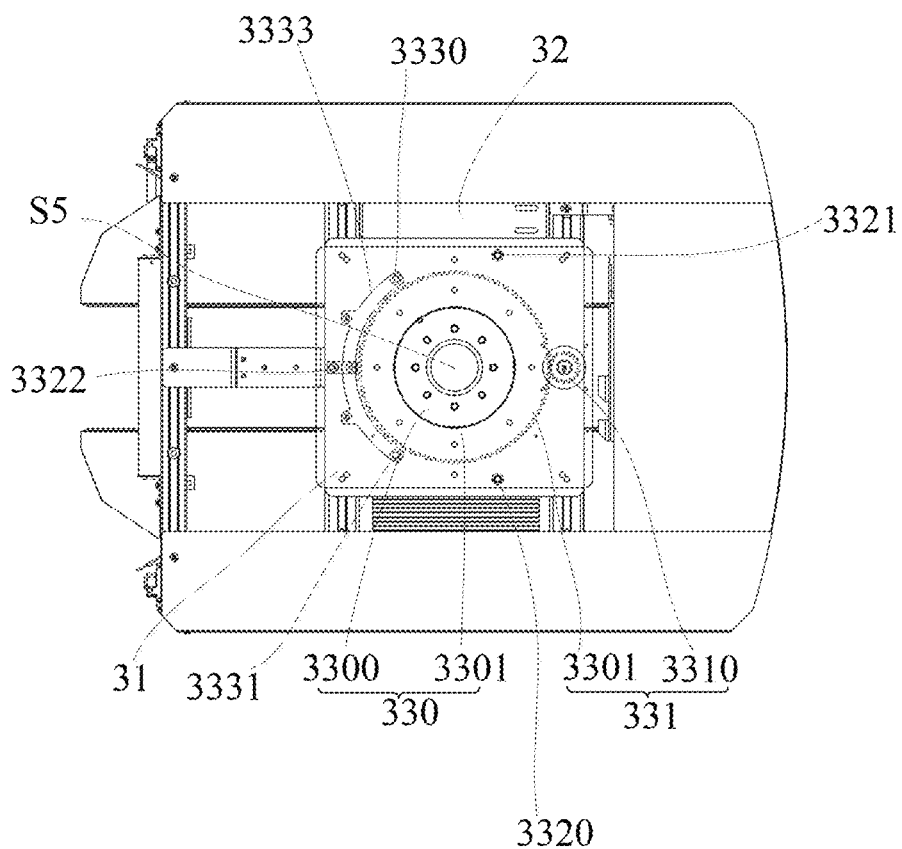
FIG. 10 is a schematic structural diagram of the material handling device shown in FIG. 6 from another angle, in which part of the structure of the material handling device is omitted.

Refer to FIG. 10 together, the rotation assembly 33 includes a rotation mechanism 330, a rotation driving mechanism 331, a deflection detection device, and a rotation limit device. The rotation mechanism 330 is installed between the fork 32 and the support bracket 31. The rotation mechanism 330 can rotate around the rotation axis S5, and the rotation driving mechanism is configured to drive the rotation mechanism 330 to rotate around the rotation axis S5. The deflection detection device is configured to control the rotation driving mechanism 331.

The rotation mechanism 330 includes a first rotation member 3300 and a second rotation member 3301. The first rotation member 3300 is installed to a surface of the support bracket 31 facing the fork 32. The second rotation member 3301 is installed to the first rotation member 3300, and the second rotation member 3301 can rotate around the rotation axis S5 relative to the first rotation member 3300. The fork 32 is installed to the second rotation member 3301.

In this embodiment, the first rotation member 3300 is a slewing bearing inner ring, and a center line of the slewing bearing inner ring is coaxial with the rotation axis S5. The second rotation member 3301 is a slewing bearing outer ring, and the slewing bearing outer ring is sleeved on the slewing bearing inner ring, so that the slewing bearing outer ring can rotate around the rotation axis S5 relative to the slewing bearing inner ring, and the slewing bearing outer ring and the slewing bearing inner ring support the fork 32 together.

It should be understood that, according to an actual situation, the first rotation member 3300 and the second rotation member 3301 are not limited to a combination of the slewing bearing inner ring and the slewing bearing outer ring.

The rotation driving mechanism 331 includes an outer ring gear 3310, a rotation driving gear 3311, and a rotation driving device. The outer ring gear 3310 is fixedly connected to the second rotation member 3301, and the outer ring gear 3310 is coaxial with the rotation axis S5. An output end of the rotation driving device is connected to the rotation driving gear 3311, and the rotation driving device is configured to drive the rotation driving gear 3311 to rotate, so that the outer ring gear 3310 that is engaged with the rotation driving gear 3311 rotates around the rotation axis S5, and drives the second rotation member 3301 fixedly connected to the outer ring gear 3310 to rotate around the rotation axis S4.

In this embodiment, the outer ring gear 3310 is integrally formed with the slewing bearing outer ring.

It should be understood that, according to an actual situation, the rotation driving mechanism 331 is not limited to the outer ring gear 3310 and the rotation driving gear 3311. For example, the rotation driving mechanism is a worm gear mechanism, a gear set, or a planetary gear mechanism.

In this embodiment, the rotation driving device is a fourth motor. It should be understood that, according to an actual situation, the rotation driving device may also be a linear motor, an air motor, a hydraulic drive system, etc.

The rotation limit device includes a first limit post 3320, a second limit bar 3321, and a limit block 3322. The first limit bar 3320 and the second limit bar 3321 are both installed to the surface of the support bracket 31 facing the fork 32, and the first limit bar 3320 and the second limit bar 3321 are circumferentially distributed around the rotation axis S5. The limit block 3322 is installed to a surface of the fork 32 facing the support bracket 31. The limit block 3322 can abut against the first limit bar 3320 and the second limit bar 3321, respectively, enabling the rotation mechanism 330 to rotate around the rotation axis S5 within a preset angle range, to drive the fork 32 to rotate to a preset angle, so that the preset angle is within the preset angle range.

The deflection detection device is configured to detect whether the fork 32 rotates to the preset angle.

When the deflection detection device detects that the fork has not yet rotated to the preset angle, the deflection detection device controls the rotation assembly to drive the fork to continue to rotate.

When the deflection detection device detects that the fork rotates over the preset position, the deflection detection device controls the rotation assembly to drive the fork to rotate in a reverse direction.

When the deflection detection device detects that the fork rotates to the preset angle, the deflection detection device controls the rotation assembly to stop rotating.

The deflection detection device includes a first sensor 3330, a second sensor 3331 and a rotation controller. The first sensor 3330 and the second sensor 3331 are both connected to the rotation controller.

The first sensor 3330 is provided with a first detection range. The first sensor 3330 is configured to detect the fork 32 within the first detection range.

The second sensor 3331 is provided with a second detection range. The second sensor 3331 is configured to detect the fork 32 within the second detection range.

The rotation controller is connected to the rotation driving device, and is configured to control the fork 32 to rotate around the rotation axis S5 through the rotation driving device.

When the first sensor 3330 detects the fork 32 in the first detection range, and the second sensor 3331 does not detect the fork 32 in the second detection range, the fork 32 has not yet rotated to the preset angle.

When the first sensor 3330 does not detect the fork 32 in the first detection range, and the second sensor 3331 detects the fork 32 in the second detection range, the fork 32 has rotated over the preset angle.

When the first sensor 3330 detects the fork 32 in the first detection range, and the second sensor 3331 detects the fork 32 in the second detection range, the fork 32 rotates to the preset angle.

In this embodiment, the first sensor 3330 is a first proximity switch, and the first proximity switch is installed to the surface of the fork 32 facing the support bracket 31. The second sensor 3331 is a second proximity switch, the second proximity switch and the first proximity switch are installed to the surface of the support bracket 31. The first proximity switch and the second proximity switch are circumferentially distributed around the rotation axis S5. The rotation controller further includes a detection board 3333. The detection board 33 is installed to the surface of the support bracket 31 facing the fork 32, and the detection board 3333 is arranged to be bend around the rotation axis S5.

When the fork 32 rotates into a first preset angle range and does not rotate into a second preset angle range, the first proximity switch faces the detection board 3333, and the second proximity switch does not face the detection board 3333.

When the fork 32 does not rotate into the first preset angle range but rotates into the second preset angle range, the first proximity switch does not face the detection board 3333, but the second proximity switch faces the detection board 3333.

When the fork 32 rotates to a benchmark angle, the first proximity switch faces one end of the detection board 3333, and the second proximity switch faces the other end of the detection board 3333.

In some embodiments, the rotation assembly 33 may be omitted, and the material handling robot may adjust a horizontal orientation of the fork 32 by the movable chassis 10 to replace the function of the rotation assembly, as long as a storage unit 23 and a corresponding warehouse shelf are located on the reference line S6 at the same time. For example, when the movable chassis 10 and the lifting assembly 40 work so that a storage unit 23 and a corresponding warehouse shelf are located at the reference line S6, one end of the inner arm section 362 installed with the manipulator 371 first passes the corresponding storage unit 23, and then the manipulator 371 unfolded relative to the inner arm section 362 pulls the inventory item to the corresponding storage unit, and then continues to pull to the temporary storage unit 35. And the fixed push rod 370 pushes the inventory item located on the temporary storage unit 35 to the corresponding storage unit 23, and then continues to push the inventory item located on the corresponding storage unit 23 to the preset position of the corresponding warehouse shelf. Since the inventory item first passes through the corresponding storage unit 23 or the corresponding warehouse shelf, then reaches the temporary storage unit 35, the temporary storage unit 35 may be omitted in this embodiment.

Refer back to FIG. 6, the detection device 34 is configured to detect the position information of the material handling device 30 relative to the inventory item, i.e., to determine whether the storage unit 23, the preset position of the warehouse shelf, or the inventory item is located on the reference line S6. It is understood that when a particular object is located on the reference line S6, the particular object is aligned with the material handling device 30.

For example, when picking up the inventory item from the preset position of the warehouse shelf, the detection device 34 may determine whether the material handling device 30 is aligned with the inventory item placed at the preset position of the warehouse shelf or whether the material handling device 30 is aligned with the preset position of the warehouse shelf where the inventory item is placed. In an embodiment, the preset position (e.g., a position where a maker is attached) at which the inventory item is placed may indicate a position of the inventory item.

A position marker may be used as a target position at the time of positioning the fork 32 of the material handling device 30. The marker is for position detection of the inventory item or the shelf. It is not limited to the forms or shapes of the marker attached on the shelf or the inventory item. In an embodiment, the marker is a two-dimensional code label, such as a QR code or a DataMatrix code. In some other embodiments, the marker may be a one-dimensional code label or a label with an asymmetrical geometric shape. In an implementation, if the asymmetrical geometric shape label (e.g., an ARToolkit marker) is adopted and formed on the shelf or the inventory item, the label with asymmetrical geometric shape may be provided without encoding any data. It should be understood that some other patterns can be employed by the marker as long as a relative position can be detected based on the marker. The calculation of the relative position may be well known for a skilled person in the art.

The detection device 34 may include a camera. When the camera captures an image of the marker, pixel coordinates of the marker within the captured image may be calculated, and then the positional deviation amounts between the material handling robot (camera) and the inventory item may be calculated based at least in part on the pixel coordinates. The positional deviation amounts may include at least one of (1) a positional deviation amount between the material handling robot and the inventory item in the travelling direction, (2) a positional deviation amount between the material handling robot and the inventory item in the vertical direction, (3) a distance between the inventory item and the manipulator, and (4) an angle deviation amount between the material handling robot and the inventory item in a horizontal plane.

For example, after an image of the marker is captured, pixel coordinates and a rotational angle of the marker in an image coordinate system are calculated. The pixel coordinates are then converted into real world coordinates, which may be used as the positional deviation amounts. The rotational angle of the marker in the pixel space may be used as the angle deviation amount of the material handling device (camera) with respect to the marker (the inventory item) in the horizontal plane.

In an embodiment, when picking up the inventory item from the shelf, the detection device 34 may capture an image of a marker attached on the warehouse shelf and calculate a relative position between the material handling device and the preset position (e.g., a position where the marker is placed) based on the image of the marker attached on the warehouse shelf. The preset position may be used as the position of the inventory item and the calculated relative position may reflect a relative position between the material handling device and the inventory item. Additionally or alternatively, a marker may be attached on the inventory item, and the detection device 34 may calculate the relative position between the material handling device 30 and the inventory item (e.g., the marker attached thereon) based at least in part on an image of the marker attached on the inventory item.

In an embodiment, when placing the inventory item at the preset position of the warehouse shelf, the detection device 34 may determine whether the material handling device 30 is aligned with the preset position of the warehouse shelf based on a captured image of the marker attached on the warehouse shelf. For example, the detection assembly 34 may determine whether the material handling device 30 is aligned with the marker attached on the shelf.

In an embodiment, the camera position of the detection device 34 with respect to the marker is deemed to be the position of the material handling device with respect to the marker. In some other embodiments, as long as the geometrical relationship between the camera and the material handling device (e.g., the fork of the material handling device) is known, it is possible for a skilled person to calculate a particular point (e.g., the central point) on the material handling device relative to the marker based on a captured image of the marker. The geometrical relationship may include the orientation of the lens of the camera, and the position on the material handling device where the camera is mounted.

Specifically, the position information of the material handling device relative to the inventory item includes a first position offset between the inventory item and the reference line in the travelling direction, and a second position offset between the inventory item and the reference line in the vertical direction, the distance between the inventory item and the manipulator along the reference line, and the deflection amount between the inventory item and the reference line in the horizontal direction. Thee position information will be described in detail below.

The position information of the material handling device relative to the inventory item includes the first position offset between the inventory item and the reference line in travelling direction.

It should be understood that the travelling direction is not limit to a specific particular direction. In an embodiment, the travelling direction may be invariable relative to the storage frame 20. For example, in an embodiment, the travelling direction may be aligned with or parallel to an orientation of the opening 26 of the storage unit 23. The travelling direction is perpendicular to a side direction. The material handling device rotates to the side direction so as to pick inventory items from the shelf or deposit/place inventory items to the shelf. In an embodiment, the travelling direction may also be perpendicular to an orientation of the opening 26 of the storage unit 23, or parallel to the side direction.

In some other embodiments, the travelling direction may be changeable relative to the storage frame 20. For example, the movable chassis 10 may move in any direction determined based on a current position and a next target position.

The detection device 34 includes a camera device 340, a primary lighting equipment 341, and a secondary lighting equipment 342. The camera device 340 is fixedly installed to a surface of the temporary storage unit 35 facing the support bracket 31, and a lens of the camera device 340 is in a direction the same or substantially the same as the direction of the extension of the telescopic arm 36. The camera device 340 is configured to acquire image information, such as, shooting the two-dimensional code on the warehouse shelf or the two-dimensional code attached on the inventory item, so as to determine whether the storage unit, the preset position of the warehouse shelf, or the inventory item is on the reference line S6. Alternatively, the camera device 340 is configured to determine the position of the inventory item relative to the warehouse shelf and the position of the inventory item relative to the storage frame 20 through an image difference algorithm, and so on.

It should be noted that if an angle between the orientation of lens and the direction of extension is less than 10 degrees, the lens of the camera is orientated in a direction substantially the same as the direction of extension of the telescopic arm.

Specifically, as shown in FIGS. 6-8, the camera device 340 is installed beneath a surface of the temporary storage unit 35. For example, the camera device 340 is fixedly amounted to a surface of the temporary storage unit 35 facing the support bracket 31. The camera device 340 may be mounted in the middle of the temporary storage unit 35. Additionally or alternatively, the camera device 340 may be aligned with a central axis of the temporary storage unit 35 in a horizontal direction.

It should be understood that, according to an actual situation, the camera device 340 may be replaced with a laser guiding device, an infrared sensor, and etc.

The primary lighting equipment 341 is installed to the temporary storage unit 35, and is located on one side of the primary lighting equipment 341 away from the camera device 340. The primary lighting equipment 341 and the lens of the camera device 340 have the same orientation. The primary lighting equipment 341 is configured to compensate for light, so that the camera device 340 can clearly shoot the two-dimensional code on the warehouse shelf or the inventory item.

The secondary lighting equipment 342 is installed on the support bracket 31, two secondary lighting equipments 342 are distributed relative to the symmetrical axis 51, and the orientation of each secondary lighting equipment 342 is inclined upward, and is arranged back to the other lighting equipment 342. The fork rotates around the rotation axis S5 until the camera device 340 is located above one secondary lighting equipment 342, and then the one secondary lighting equipment 342 can further perform light compensation on the camera device 340, so that the handling robot 100 can be adapted to different lighting environments, such as day and night. The secondary lighting equipment 342 is arranged to be inclined, so that the light emitted by the secondary lighting equipment 342 is not easily all reflected to the lens of the camera device 340, resulting in excessive light compensation.

It should be understood that the above one or more devices of the detection assembly 34 may also be mounted at other positions of the material handling device 30. For example, the lighting equipments 341 and 342 may be mounted to an end of the telescopic arm 36, and the camera 342 may be liftable relative to the support bracket 31 and mounted to the support bracket 31.

It is not limited to the number of devices included in the detection assembly 34. For example, as shown in FIG. 6, the detection assembly 34 may include a single primary lighting equipment 341 and two secondary lighting equipment 342. However, the detection assembly may include two or more primary lighting equipment 341 and a single secondary lighting equipment 342. In some embodiments, the detection assembly 34 may include one or more processors.

It should be noted that the detection assembly 34 may include one or more cameras. For example, the detection assembly 34 includes two cameras, where a first camera (e.g., the camera 340) may be used to capture an image of a code label attached on the shelf and mounted beneath a surface of the temporary storage unit 35, and a second camera may be used to capture an image of a code label attached on the inventory item and mounted above the temporary storage unit 35. In an embodiment, the second camera may be mounted to a particular position of a rear housing member 383, where the particular position is above or over an upper surface of the temporary storage unit.

As shown in FIGS. 1-2, and 6-7, the fork 32 further includes a housing 38. The housing 38 is installed around the temporary storage unit 35 and configured to prevent the inventory item on the temporary storage unit 35 from falling off. At least a part of the temporary storage unit 35 and the telescopic arm 36 is in the housing 38. For example, as shown in FIGS. 1-2 and 6-7, at least a part of the telescopic arm 36 and at least a part of the temporary storage unit 35 are housed in the housing 38.

As shown in FIGS. 1-2 and 6-7, the housing 38 is U-shaped. The housing 38 includes a left housing member 381, a right housing member 382, and a rear housing member 383. The left housing member 381 is configured to house at least a part of one telescopic arm 36, and the right housing member 382 is configured to house at least a part of another telescopic arm 36. The left housing member 381 and the right housing member 382 are spaced apart from each other by a distance, and the temporary storage unit 35 is disposed between the left housing member 381 and the right housing member 382. In some embodiments, the housing 38 may further include a bottom housing member connected to each of the left housing member 381, the right housing member 382, and the rear housing member 383. The temporary storage unit 35 may be disposed on the bottom housing member. However, it should be understood that the bottom housing member may be omitted, and the temporary storage unit 35 may be connected to and supported by the left housing member 381 and the right housing member 382.

As shown in FIGS. 6-8, an upper surface (or end) of each of the left housing member 381, the right housing member 382 and the rear housing member 383 is higher than the upper surface of the temporary storage unit 35.

It is not limited to the ways to connect the housing members and install the housing 38. In an embodiment, the housing members are integrally formed into one piece. In some other embodiments, the left housing member 381, the right housing member 382 and the rear housing member 383 are separate components. Both the left housing member 381 and the right housing member 382 may be connected to the rear housing member 383 via fasteners, such as screwed nuts. However, it may be also possible that one of the left housing member 381 and the right housing member 382 is integrally formed with the rear housing member 383, and another of the left housing member 381 and the right housing member 382 is connected to the rear housing member 383 by fasteners.

It should be understood that the bottom housing member may be integrated with any or all of the left housing member 381, the right housing member 382 and the rear housing member 383. However, the bottom housing member may also be attached to any or all of the left housing member 381 and the right housing member 382 by fasteners (e.g., threaded screws).

In an embodiment, the left housing member 381 may be integrally formed with one telescopic arm 36, and the right housing member 382 may be integrally formed with another telescopic arm 36.

It is not limited to the shape and structure of each of left housing member 381, the right housing member 382 and the rear housing member 383, as long as the housing 38 is U-shaped as a whole. In an embodiment, the rear housing member 383 includes an arcuate outer surface. And in some other embodiments, the rear housing member 383 includes a flat outer surface. If the left housing member 381 and the right housing member 382 are symmetrically disposed relative a reference line, and the rear housing member 383 connects to both an end of the left housing member 381 and an end of the right housing member 382, a U-shaped housing 38 is formed.

As shown in FIGS. 1-2 and 6-7, a compartment 39 configured to accommodate the inventory item is provided in the fork 32. In an embodiment, the elements including at least the housing 38 and the temporary storage unit 35 form the compartment 39. The compartment 39 is provided with a single opening 391 in a direction parallel to the direction of extension or retraction of the telescopic arm 36.

It can be seen from FIGS. 1-2 and 6-7 that the single opening 391 is formed in the fork 32 in the direction parallel to the direction of extension or retraction of the telescopic arm 36. In an embodiment, as shown in FIGS. 1-2 and 6-7, the U-shaped housing 38 is provided with the single opening 391 in the horizontal direction at the front side of the fork 32, which is away from the rear housing member 383. For example, when picking up the inventory item from the warehouse shelf, the single opening 391 is aligned with the warehouse shelf and is orientated towards the warehouse shelf.

The single opening 391 is located at a side opposite to the rear housing 383. It is obvious that the inventory item can only be pushed away or pulled into the temporary storage unit 35 through the single opening 391. Because there is only one opening in the direction of extension or retraction of the telescopic arm 36, the telescopic arm 36 cannot extend in two directions. It is obvious from FIGS. 1-2 and 6-7 that the telescopic arm 36 can only extend in a single direction through the single opening 391. That is, the telescopic arm 36 can only extend in the direction towards the opening 391, and the telescopic arm 36 cannot extend in a reverse direction. For example, the telescopic arm 36 cannot extend in a direction towards the rear housing member 383. The telescopic arm 36 is extendable in a single direction relative to the U-shaped housing 38 or the temporary storage unit 35.

The lifting assembly 40 is configured to drive the material handling device 30 to move relative to the storage frame 20 in the vertical direction. The lifting assembly 40 includes a lifting transmission mechanism and a lifting drive mechanism 42. The lifting drive mechanism 42 is configured to provide a second driving force for movement of the material handling device 30 relative to the storage frame 20 in the vertical direction, and the lifting transmission mechanism is configured to transmit the second driving force to the material handling device 30.

The lifting transmission mechanism includes two sets of synchronous wheel mechanisms 43. The two sets of synchronous wheel mechanisms 43 are installed to two opposite surfaces of the two vertical columns 115, respectively. Each set of synchronous wheel mechanism 43 includes a driving synchronous wheel 430, a tension wheel 431 and a synchronous belt 432. The driving synchronous wheel 430 is installed at one end of the vertical columns 115 near the base body 112, and the tension wheel 431 is installed at one end of the vertical columns 115 away from the base body 112. The tension wheel 431 and the driving synchronous wheel 430 are sleeved on the synchronous belt 432. The lifting drive mechanism 42 is connected to the driving synchronous wheel 430, and is configured to drive the driving synchronous wheel 430 to rotate. The driving synchronous wheel 430 drives the synchronous belt 432 to move in the vertical direction, so that the support bracket 31 fixedly connected to the synchronous belt 432 synchronously moves in the vertical direction.

The synchronous belt 432 of each synchronous wheel mechanism 43 is connected with a counterweight 433. Each counterweight 433 has a certain mass, and is installed on a counterweight rail of a corresponding vertical column 115. Each counterweight 433 can move relative to the corresponding vertical column 115 in the vertical direction. When the material handling device 30 moves in the vertical direction, the counterweight 433 can act as a buffer, and reduce the load of the lifting drive mechanism 42.

It should be understood that, on one hand, according to an actual situation, the number of the synchronous wheel mechanisms 43 is not limited to two. For example, the number of the synchronous wheel mechanisms 43 may be one, two or more, as long as there is at least one. On the other hand, according to an actual situation, the lifting transmission mechanism is not limited to the synchronous wheel mechanism 43. For example, the lifting transmission mechanism may also be a sprocket wheel mechanism, or a gear rack mechanism, a turbine worm mechanism, a lifting screw mechanism, and so on.

Since the support bracket 31 supports the fork, the lifting drive mechanism has a large load during the transport of the inventory item. In order to ensure that the material handling device can smoothly lift, two synchronization wheel mechanisms have a high synchronization rate.

The lifting drive mechanism 42 includes a lifting driving device 420, a driving shaft 421, a driving gear, and a driven gear (both the driving gear and the driven gear are installed in the gearbox 422 in the figure). Two ends of the driving shaft 421 are connected to two driving synchronous wheels 430 of the two synchronous wheel mechanisms 43 through flat keys. The driving shaft 421 transmits a torque to the driving synchronous wheel 430 through the flat keys, so that the driving synchronous wheels 430 of the two synchronous wheel mechanisms 43 can rotate synchronously, which allows the material handling device 30 to smoothly move in the vertical direction. The driven gear is sleeved between two shafts of the driving shaft 421, and the driving gear engages with the driven gear to transmit the driving force of the lifting driving device 420.

It should be understood that, according to an actual situation, the synchronous wheel mechanism 43 may be replaced with a sprocket wheel mechanism, or a gear rack set, or the like.

In some embodiments, short shafts at both ends of the driving shaft 421 are coaxially connected by a coupling. One end of one short shaft facing away from the coupling is connected to the driving synchronous wheel 430 of one synchronous wheel mechanism 43, and one end of the other short shaft facing away from the coupling is connected to the driving synchronous wheel 430 of the other synchronous wheel mechanism 43, which can further ensure the synchronization rate of the two driving synchronous wheels 430.

In this embodiment, the lifting driving device 420 is a fifth motor. It should be understood that, according to an actual situation, the lifting drive device is not limited to the fifth motor. For example, the lifting driving device may also be an air motor, hydraulic transmission system, etc.

When the handling robot 100 is in a work state, the handling robot 100 specifically involves the following several processes:

The handling robot 100 transports the inventory item on the warehouse shelf to the temporary storage unit. In step 1, the movable chassis 10 drives the handling robot 100 to move to a warehouse shelf where an inventory item is placed. The movable chassis 10 is guided by the guiding device 14 so that the movable chassis 10 travels along a specified path, and when reaching the warehouse shelf where the inventory item is placed, the movable chassis 10 is stationary relative to the warehouse shelf. The movable chassis 10 moves in a travelling direction. In step 2, the lifting assembly 40 drives the fork 32 to move relative to the warehouse shelf in the vertical direction, so that the reference line S6 of the fork 32 is on the same horizontal plane as the inventory item. In an embodiment, the fork 32 moves sideways relative to the travelling direction to pull or push the inventory item. For example, the fork 32 may be rotated so that the horizontal orientation of the fork is perpendicular to the travelling direction. In step 3, the fork 32 rotates around the vertically set rotation axis S5, so that the inventory item is on the reference line S6 (e.g., so as to make sure the inventory item is aligned with the fork 32). In step 4, the telescopic arm 36 extends along the reference line. The manipulator 371 installed at one end of the inner arm section 362 folds relative to the inner arm section 362, and the one end of the inner arm section 362 installed with the manipulator 371 moves from a side of the inventory item facing the temporary storage unit 35 to a side of the inventory item facing away the temporary storage unit 35. In step 5, the manipulator 371 unfolds relative to the inner arm section 362, and then the telescopic arm 36 is retracted so that the manipulator 371 pulls the inventory item into the temporary storage unit 35.

The handling robot 100 transports an inventory item in the temporary storage unit 35 to a storage pallet. In step 1, the fork 32 rotates relative to the storage frame 20 around the rotation axis S5 until the reference line S6 of the fork 32 is on the same vertical plane as the storage unit (in an embodiment provided by the present application, when the reference line S6 of the fork 32 is on the same vertical plane as the storage unit, the fork 32 is at a benchmark angle relative to the support bracket 31). In step 2, the lifting assembly 40 drives the fork 32 to move in the vertical direction, so that one storage unit is located on the reference line S6 (e.g., so as to make sure that the one storage unit is aligned with the fork). In step 3, the telescopic arm 36 extends along the reference line S6 so that the fixed push rod 370 installed at an end of the inner arm section 362 facing away from the manipulator 371 pushes the inventory item located in the temporary storage unit 35 into a corresponding storage unit 23.

The handling robot 100 transports an inventory item in a storage pallet to the temporary storage unit 35. In step 1, the fork 32 rotates relative to the storage frame 20 around the rotation axis S5 until the reference line S6 of the fork 32 is on the same vertical plane as the storage unit. In step 2, the lifting assembly 40 drives the fork 32 to move in the vertical direction, so that one storage unit is located on the reference line S6. In step 3, the telescopic arm 36 extends along the reference line. The manipulator 371 installed at one end of the inner arm section 362 folds relative to the inner arm section 362, and one end of the inner arm section 362 installed with the manipulator 371 moves from the side of the inventory item facing the temporary storage unit to the side of the inventory item facing away the temporary storage unit. In step 5, the manipulator 371 unfolds relative to the inner arm section 362, and then the telescopic arm 36 is retracted so that the manipulator 371 pulls the inventory item into the temporary storage unit.

The handling robot 100 transports the inventory item in the temporary storage unit to the warehouse shelf.

In step 1, the movable chassis 10 drives the handling robot 100 to move to a preset position of the warehouse shelf. The movable chassis 10 is guided by the guiding device 14 to allow the movable chassis 10 to travel along a specified path. When reaching the warehouse shelf, the movable chassis 10 is stationary relative to the warehouse shelf. In step 2, the lifting assembly 40 drives the fork 32 to move relative to the warehouse shelf in the vertical direction, so that the reference line S6 of the fork 32 is on the same horizontal plane as the preset position. In step 3, the fork 32 rotates around the vertically set rotation axis S5, so that the preset position is on the reference line S6 (e.g., so as to make sure the preset position is aligned with the fork). In step 4, the telescopic arm 36 extends along the reference line S6, so that the fixed push rod 370 installed at an end of the inner arm section 362 facing away the manipulator 371 pushes the inventory item located in the temporary storage unit to the preset position of the warehouse shelf.

It should be understood that the number in "step 1", . . . , "step 5" does not mean a particular order in which the described-above processes must be performed. The number in "step 1", . . . , "step 5" is for illustrative purposes only. The described-above process may be performed in any other order as long as the material handling device can pick up or deposit the inventory item. For example, when the handling robot 100 transports the inventory item on the warehouse shelf to the temporary storage unit, the step 2 or step 3 may be performed before step 1, and the step 3 may be performed before step 2.

An embodiment of the present application provides a handling robot 100. The handling robot 100 includes: a movable chassis 10; a storage frame 20, installed on the movable chassis 10, and provided with a plurality of storage units 23 distributed in a vertical direction, each storage unit 23 being configured to place an inventory item; a material handing device 30, configured to transport an inventory item between a warehouse shelf and any one of the storage units 23, where the material handling device 30 has a preset horizontal reference line S6, and the material handling device 30 includes a pusher assembly, the pusher assembly can move relative to the storage frame along the reference line; and a lifting assembly, configured to drive the material handling device to move in a vertical direction so that any one of the storage units is located on the reference line. When one of the storage units is located on the reference line (e.g., the one of the storage units is aligned with the material handling device), the pusher assembly can push the inventory item to a corresponding storage unit along the reference line, or the pusher assembly can pull the inventory item located on the corresponding storage unit away therefrom. By the above method, the handling robot 100 equipped with the storage frame 20 can load a large number of inventory items.

Additionally, it can be realized that an inventory item is pushed into or pulled away a storage unit, so that a distance between each two adjacent storage units is small, and more storage units can be placed in the handling robot with the same vertical height, increasing the maximum load capacity.

In addition, for such push-pull method for transporting an inventory item, there is no requirement for the shape of the inventory item, as long as the inventory item can be pushed by a push rod, which allows the handling robot has a wide range of applications. The inventory item in embodiments of the present invention may be any objects, goods, materials, components, or articles. The inventory item may also be a container, a box, or a pallet, which may contain or hold a single or multiple types of objects, goods, materials, components, or articles and may be pushed or pulled by the pusher assembly. The number of objects, goods, materials or articles contained in the container, box or pallet is not limited so long as the requirements of the inventory management system are met.

Moreover, for such push-pull method for transporting an inventory item, the inventory item transported by the material handling device 30 each time may be a single object or several separated objects. For example, when the material handling device 30 transports the inventory item from the warehouse shelf, a plurality of objects on the warehouse shelf are sequentially arranged along the reference line S6. One end of the inner arm section 362 installed with the manipulator 371 moves from the front side of the closest object to the back side of the farthest object, and then the manipulator 371 pulls the plurality of objects together away the warehouse shelf.

Figure 11:
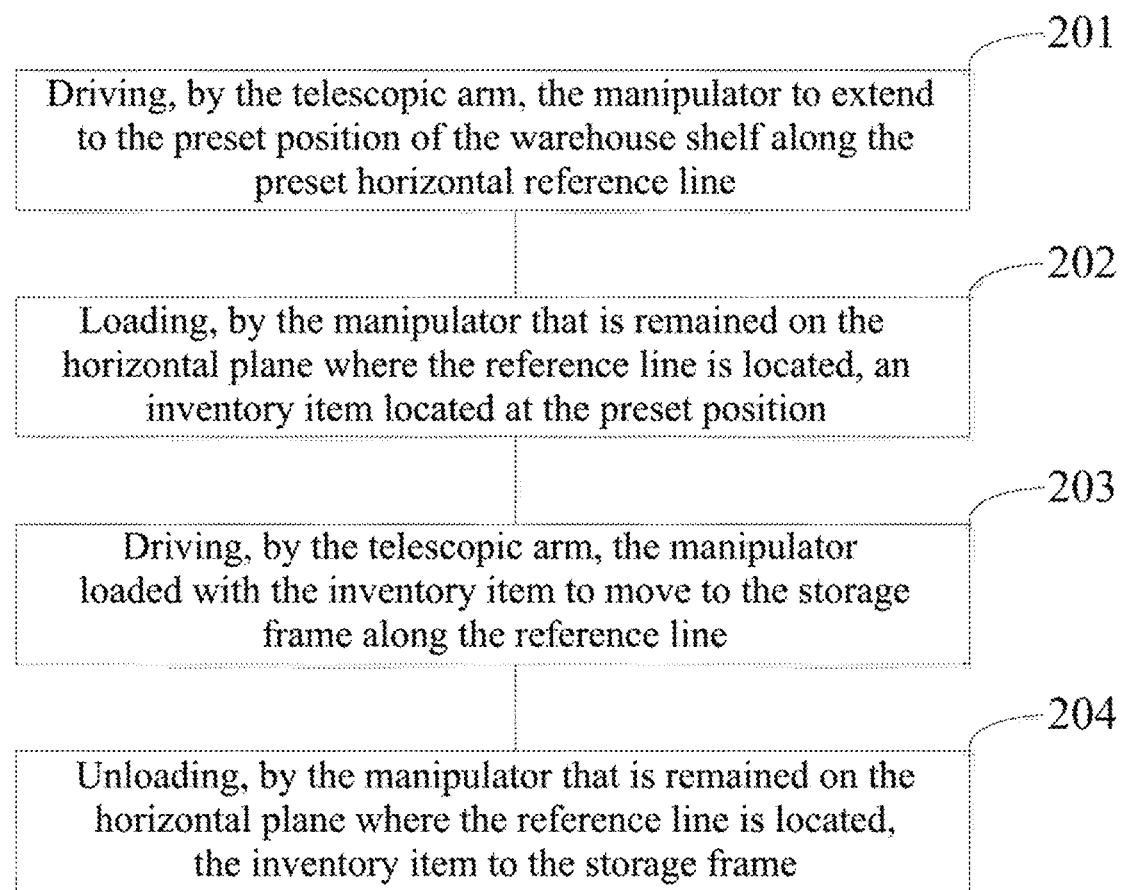
FIG. 11 is a flowchart of a method for retrieving an inventory item according to another embodiment of the present application.

Refer to FIG. 11 together, another embodiment of the present application provides a method for retrieving an inventory item based on the handling robot 100 above. The method for retrieving an inventory item includes the following steps.

Step 201: driving, by the telescopic arm, the manipulator to extend to the preset position of the warehouse shelf along the preset horizontal reference line.

The manipulator at one end of the telescopic arm extends to the preset position of the warehouse shelf along the reference line.

Step 202: loading, by the manipulator that is remained on the horizontal plane where the reference line is located, an inventory item located at the preset position.

In this embodiment, the manipulator is configured to pull the inventory item. According to an actual situation, the manipulator may be in various forms. For example, the manipulator may be in the form of clip or pallet, but is not limited thereto. In this embodiment, the manipulator drags the inventory item. In some embodiments, according to an actual situation, the manipulator can clamp the inventory item, or support the inventory item, etc., as long as the manipulator can drive the inventory item to move along the reference line.

Step 203: driving, by the telescopic arm, the manipulator loaded with the inventory item to move to the storage frame along the reference line.

Step 204: unloading, by the manipulator that is remained on the horizontal plane where the reference line is located, the inventory item to the storage frame.

It should be noted that whether the manipulator moves, loads or unloads the inventory item is carried out on the preset horizontal reference line, having a high utilization rate in the vertical space, and a reasonable utilization of the vertical space.

Since the position of the inventory item on the warehouse shelf, i.e., the preset position, may not be on the same horizontal plane as the reference line, a lifting assembly is added to drive the material handling device to move in the vertical direction. During the lifting process of the material handling device, the reference line can be on the same horizontal plane with the inventory item located at any height.

In some embodiments, before step 201, the method for retrieving an inventory item further includes:

Step 2005: driving, by the lifting assembly, the material handling device to move in the vertical direction, so that the manipulator is horizontally aligned with the preset position.

It should be noted that the material handling device moves in the vertical direction to a height of the preset position so that the manipulator is horizontally aligned with the preset position.

It should be understood that information about a particular height indicating a height of the shelf where the inventory item is placed may be sent from a management server to the handling robot 100 so that the material handling device 30 can directly move upwards or downwards to the particular height, thereby being aligned with the preset position of the shelf.

Due to an economic factor in terms of land occupation in the warehouse, the value of horizontal space is higher than that of vertical space. Therefore, a preferred option is that the storage frame is provided with a plurality of storage units distributed in a vertical direction. Under the condition of providing the lifting assembly, the lifting assembly can also be fully utilized.

In some embodiments, before step 203, the method for retrieving an inventory item further includes:

Step 2025: driving, by the lifting assembly, the material handling device to move in the vertical direction, so that the material handling device is horizontally aligned with a corresponding storage unit and is therefore at a same height as the corresponding storage unit.

The material handling device is aligned with any corresponding storage unit through the lifting assembly, and then the inventory item can be stored in the corresponding storage unit.

The handling robot is equipped with the movable chassis, and can move between different warehouse shelves, so that the handling robot can realize the function of transporting the inventory item between different warehouse shelves.

In some embodiments, before or after step 2005, the method for retrieving an inventory item further includes:

Step 2004: moving the movable chassis to a preset range in front of the warehouse shelf.

The movable chassis carries the storage frame, the material handling devices, etc. to move to a preset range in front of the warehouse shelf. The warehouse shelf here may be a warehouse shelf in which an inventory item to be transported is placed, or a warehouse shelf in which an inventory item to be transported needs to be placed.

It should be understood that the movable chassis identifies two-dimensional code labels on the ground so as to navigate from a current position to a target position in front of the shelf. The information about the target position may be sent from the management server to the handling robot.

Since the material handling device needs to be aligned with the inventory item, i.e., keeping the inventory item on the reference line, it needs to perform alignment by the lifting assembly in the vertical direction, and perform adjustment by the movable chassis in the horizontal direction, so that the inventory item is located on the reference line in the horizontal direction, improving an accuracy of the manipulator for loading the inventory item.

The material handling device is provided with a detection device for detecting a position of the material handling device relative to the inventory item, i.e., detecting whether the inventory item is on the reference line.

In some embodiments, before step 201, the method for retrieving an inventory item further includes:

Step 2026: detecting, by the detection device, position information of the material handling device relative to the inventory item, and adjusting, by the handling robot, a posture of fetching the inventory item according to the position information of the material handling device relative to the inventory item.

It should be understood that adjustment of the posture of retrieving the inventory item may be controlled by one or more processors of the handling robot.

In an actual situation, an adjustment of the position of the reference line only by the movable chassis has a low efficiency. This is due to a low efficiency of turning of the present movable chassis on one hand, and a high load of the handling robot and not high accuracy of the movement of the handling robot on the other hand, thereby the adjustment of the position of the reference line only by the movable chassis having a low efficiency.

Therefore, it is necessary to perform a joint adjustment in various aspects, to improve the efficiency and accuracy of the posture of fetching the inventory item by the handling robot.

Specifically, the movable chassis is provided with a travelling direction, and the movable chassis has the highest efficiency when moving in the travelling direction.

The position information of the material handling device relative to the inventory item includes a first position offset between the inventory item and the reference line in the travelling direction. A skilled person in the art knows that the reference line represents the material handling device and that the first position offset is actually a relative position between the material handling device and the inventory item in the travelling direction. For example, in an embodiment, the first position offset may represent a positional deviation amount of the material handling device with respect to the inventory item in the travelling direction.

In step 2026, the adjusting, by the handling robot, a posture of fetching the inventory item according to the position information of the material handling device relative to the inventory item includes:

Step 2026A: causing the movable chassis to move in the travelling direction according to the first position offset, so that the first position offset is smaller than a first error value.

The handling robot may adjust movement of the movable chassis based on the first position offset to make sure that a new detection of the first position offset (e.g., an update of the first position offset in next time) is smaller than a threshold (e.g., the first error value). For example, the handling robot includes one or more memories for storing instructions (e.g., program codes), and one or more processors configured to execute the stored instructions so as to control the movable chassis to move in the travelling direction based at least in part on the first position offset.

Since it is difficult to move the movable chassis to a position with a determined value during the adjustment of the movable chassis, the first error value is set. As long as an actual error, i.e., the first position offset, is smaller than the first error value, it can be considered that the movable chassis moves to a desired place and the material handling device is deemed to be aligned with the inventory item in some aspect. A person skilled in the art can set the first error value in the handling robot in advance according to an actual situation. Once the first position offset is smaller than the first error value, the material handling device may start to pick up (e.g., pull) the inventory item if the material handling device is deemed to be aligned with the inventory item in other aspects.

Further, the position information of the material handling device relative to the inventory item includes a second position offset between the inventory item and the reference line in the vertical direction. A skilled person in the art knows that the second position offset is actually a relative position between the material handling device and the inventory item in the vertical direction. For example, in an embodiment, the second position offset may represent a positional deviation amount of the material handling device with respect to the inventory item in the vertical direction.

In step 2026, the adjusting, by the handling robot, a posture of fetching the inventory item according to the position information of the material handling device relative to the inventory item includes:

Step 2026B: driving, by the lifting assembly, the material handling device to move in the vertical direction according to the second position offset, so that the second position offset is smaller than a second error value.

The handling robot adjusts movement of the material handling device based on the second position offset to make sure that a new detection of the second position offset (e.g., an update of the second position offset detected in next time) is smaller than a threshold (e.g., the second error value). The one or more processors of the handling robot may be configured to execute instructions stored in one or more memories so as to control the material handling device to move in the vertical direction based at least in part on the second position offset.

It should be noted that, in step 2005, the material handling device has achieved a preliminary lifting, but the inventory item has not been accurately positioned on the reference line, and then by fine-tuning, the reference line can be located near the middle of the inventory item, to improve the accuracy of retrieving the inventory item. A person skilled in the art can set the second error value in the handling robot in advance according to an actual situation.

In an embodiment, in order to transfer an inventory item from a shelf, a management server may notify the handling robot of a particular height (e.g., 2 m) of the shelf where the inventory item is placed. After the handling robot reaches the shelf, the material handling device moves in the vertical direction to the particular height (e.g., the material handling device moves in the vertical direction so that the material handling device is at a height of 2 m), and then performs the fine-tuning procedure. During the fine-tuning procedure, the material handling device may move downwards by a preset distance (e.g., 10 mm), and a convergence error (e.g., 2 mm) may be preset. When the material handling device is at the particular height (e.g., 2 m), if the position offset between the material handling device and the inventory item (e.g., the marker attached on the shelf or the inventory item) in the vertical direction is within a range of [the preset distance−preset convergence error, the preset distance+preset convergence error] (e.g., [10 mm−2 mm, 10 mm+2 mm]), it can be deemed that the material handling device moves to a desired height. In this case, an error value may be set as 12 mm (10 mm+2 mm) in advance, and another error value may be set as 8 mm (10 mm−2 mm) in advance. The second position offset needs to be smaller than 12 mm, which is set as the sum of the preset distance and the preset convergence error in advance.

Similarly, hi some, other embodiments; in order to transport an inventory item to a shelf from somewhere else, the management server may notify the handling robot of a particular height of the shelf where the inventory item is to be placed. After the handling robot reaches the target shelf, the material handling device moves in the vertical direction to the particular height, and then performs the fine-tuning procedure. During the fine-tuning procedure, the material handling device may move upwards by a preset distance (e.g., 10 mm), and a convergence error (e.g., 2 mm) may be preset. If the position offset between the material handling device and the marker attached on the shelf in the vertical direction is within a range of [10 mm−2 mm, 10 mm+2 mm], it can be deemed that the material handling device moves to a desired height.

Further, the position information of the material handling device relative to the inventory item includes a distance between the inventory item and the manipulator along the reference line. A skilled person in the art knows that the direction along the reference line represents the direction of extension of telescopic arm and that the distance between the inventory item and the manipulator along the reference line is a distance between the inventory item and the manipulator in a direction of extension of the telescopic arm.

In step 2026, the adjusting, by the handling robot, a posture of fetching the inventory item according to the position information of the material handling device relative to the inventory item includes:

Step 2026C: adjusting an extension amount of the telescopic arm along the reference line according to the distance, so that the extension amount is larger than the distance.

The one or more processors of the handling robot may be configured to execute instructions stored in one or more memories so as to control the telescopic arm to extend based at least in part on the detected distance.

It should be understood that by setting the extension amount of the telescopic arm, the time for the telescopic arm to extend to the preset position can be minimized, and the efficiency of retrieving an inventory item can be improved. A person skilled in the art may set the distance in the handling robot in advance according to an actual situation.

In some embodiments, during extension of the telescopic arm, an obstacle may be detected by the detection assembly. Based on the detection of presence of the obstacle, the handling robot (e.g., the one or more processors of the handling robot) controls the telescopic arm to stop extending so as to avoid a collision with the obstacle.

In this embodiment, the detection device includes an image acquisition device. It should be understood that, according to an actual situation, the detection device can also be in other forms. For example, the material handling device is provided with a laser transmitter and a laser receiver, and the inventory item is provided with a reflective surface, and the positioning of the material handling device relative to the inventory item can be realized by the laser transmitter emitting a laser to the reflective surface, and the laser reflected by the reflective surface entering the laser receiver. Alternatively, the material handling device is provided with a radio frequency transmitter, and the inventory item is attached with an electronic label, and the position relationship between the material handling device and the inventory item can be determined by radio frequency identification.

It should be noted that the detection assembly 34 may include any combination of the above-mentioned sensors and detection results from one or more sensors may be fused in order to increase accuracy of detection and enhance robustness of the detection assembly.

In an embodiment, when the image acquisition device acquires image information of the inventory item, the detection device detects the position information of the material handling device relative to the inventory item.

Further, a surface of the inventory item facing to the handling robot is attached with a two-dimensional code label. When the image acquisition device acquires the image information of the inventory item, the image acquisition device collects the information provided by the two-dimensional code label, and obtain the position information of the material handling device relative to the inventory item.

In some embodiments, as described before, a two-dimensional code label may be attached at the preset position of the warehouse shelf, where the inventory item is placed at the preset position. The image acquisition device (e.g., an image sensor, or a camera assembly) captures an image of the code label attached on the warehouse shelf and determine position information between the material handling device and the code label attached on the warehouse shelf. The position information between the material handling device and the code label attached on the warehouse shelf may reflect the relative position between the material handling device and the inventory item.

In an actual situation, it may happen that a height of the warehouse shelf and a height of the storage frame are not on the same horizontal plane. At this time, the inventory item cannot be directly transported from the preset position of the warehouse shelf to the storage frame. Installing a temporary storage unit on the material handling device can realize transportation of the inventory item in the case that the height of the warehouse shelf and the height of the storage frame are not on the same horizontal plane.

In some embodiments, before step 203, the method for retrieving an inventory item further includes:

Step 2027: driving, by the telescopic arm, the manipulator loaded with the inventory item to retract to the temporary storage unit along the reference line.

Step 2028: unloading, by the manipulator that is remained on the horizontal plane where the reference line is located, the inventory item to the temporary storage unit.

Step 2029: loading, by the manipulator that is remained on the horizontal plane where the reference line is located, the inventory item located on the temporary storage unit.

The inventory item on the warehouse shelf is first transported to the temporary storage unit, and then the lifting assembly lifts or lowers the temporary storage unit (the material handling device) to make the temporary storage unit and one storage unit located at the same height, transporting the inventory item to the corresponding storage unit.

Since inventory items are solid and mostly cuboid, and in an actual situation, retrieving an inventory item requires a high accuracy when directly facing the inventory item. It is difficult for the reference line to pass through the inventory item and be orthogonal to one surface of the inventory item by movement of the movable chassis in only one horizontal dimension. Therefore, a horizontal dimension is supplemented to increase the flexibility of the adjustment of the posture of fetching the inventory item, which can more quickly adjust the posture of fetching the inventory item and improve accuracy of retrieving the inventory item at the same time.

In some embodiments, after step 2029 and before step 203, the method for retrieving an inventory item further includes:

Step 2030: driving, by the rotation assembly, the telescopic arm to rotate to a preset angle around a vertical direction, so that the material handling device is oriented towards the storage frame.

In some embodiments, the position information of the material handling device relative to the inventory item includes a deflection amount between the inventory item and the reference line in the horizontal direction. A skilled person in the art knows that the deflection amount is an angle deviation amount of the material handling device with respect to the inventory item in the horizontal plane.

In step 2026, the adjusting, by the handling robot, a posture of fetching the inventory item according to the position information of the material handling device relative to the inventory item includes:

Step 2026D: driving, by the rotation assembly, the fork to rotate around a vertical direction according to the deflection amount, so that the deflection amount is smaller than a third error value.

The handling robot controls rotation of the fork based on the deflection amount to make sure that a new detection of the angle deviation amount (e.g., an update of the angle deviation amount detected in next time) is smaller than a threshold (e.g., the third error value). The one or more processors of the handling robot may be configured to execute instructions stored in the one or more memories so as to control the fork to rotate based at least in part on the angle deviation amount.

A person skilled in the art may set the third error value in the handling robot in advance according to an actual situation.

The rotation requires a high precision and requires a high speed to improve efficiency, but it is difficult for the fork to stop at a preset angle due to the inertia during the rotation.

In some embodiments, the driving, by the rotation assembly, the fork to rotate around a vertical direction includes: when the deflection detection device detects that the fork has not yet rotated to the preset angle, driving, by the rotation assembly, the fork to continue to rotate; when the deflection detection device detects that the fork has rotated over the preset angle, driving, by the rotation assembly, the fork to rotate in a reverse direction; and when the deflection detection device detects that the fork rotates to the preset angle, causing the rotation assembly to stop rotating.

The deflection detection device controls the rotations of the fork, and makes the fork to rotate to the preset angle.

Specifically, the deflection detection device includes: a first sensor provided with a first detection range; and a second sensor provided with a second detection range.

When the first sensor detects the fork in the first detection range, and the second sensor does not detect the fork in the second detection range, the deflection detection device detects the fork has not yet rotated to the preset angle.

When the first sensor does not detect the fork in the first detection range, and the second sensor detects the fork in the second detection range, the deflection detection device detects the fork has rotated over the preset angle.

When the first sensor detects the fork in the first detection range, and the second sensor detects the fork in the second detection range, the deflection detection device detects the fork rotates to the preset angle.

In order to improve the utilization of the warehouse in the horizontal space, inventory items are placed in positions at two different depths of the warehouse shelf, which may decrease an aisle for the handling robot and improve the utilization rate of the warehouse in the horizontal space.

In some embodiments, the inventory item includes a first inventory item and a second inventory item.

The preset position includes a first preset position and a second preset position.

The first inventory item is located at the first preset position, and the second inventory item is located at the second preset position.

The storage frame includes a first storage unit and a second storage unit.

When there is the second inventory item behind the first inventory item, the method for retrieving an inventory item further includes:

Step 301: driving, by the telescopic arm, the manipulator to extend to the first preset position of the warehouse shelf along the reference line.

Step 302: loading, by the manipulator that is remained on the horizontal plane where the reference line is located, the first inventory item located at the first preset position.

Step 303: driving, by the telescopic arm, the manipulator loaded with the first inventory item to move to the first storage unit along the reference line.

Step 304: unloading, by the manipulator that is remained on the horizontal plane where the reference line is located, the first inventory item to the first storage unit.

Step 305: driving, by the telescopic arm, the manipulator to move to the second preset position of the warehouse shelf along the reference line.

Step 306: loading, by the manipulator that is remained on the horizontal plane where the reference line is located, the second inventory item located at the second preset position.

Step 307: driving, by the telescopic arm, the manipulator loaded with the second inventory item to move to the second storage unit along the reference line.

Step 308: unloading, by the manipulator that is remained on the horizontal plane where the reference line is located, the second inventory item to the second storage unit.

The first inventory item is transported to the first storage unit, and then the second inventory item is transported to the second storage unit.

In an actual situation, there may be a case where only the second inventory item is needed and the first inventory item is not needed.

In some embodiments, the method for retrieving an inventory item further includes:

Step 309: driving, by the telescopic arm, the manipulator to move to the first storage unit along the reference line.

Step 3010: driving, by the telescopic arm, the manipulator to remain on the horizontal plane where the reference line is located to load the first inventory item located on the first storage unit.

Step 3011: driving, by the telescopic arm, the manipulator loaded with the first inventory item to move to the first preset position of the warehouse shelf along the reference line.

Step 3012A: unloading, by the manipulator that is remained on the horizontal plane where the reference line is located, the first inventory item to the first preset position of the warehouse shelf.

In an actual situation, it is not the best choice to place the unwanted first inventory item in the first preset position, because the second preset position is empty, and the second preset position is behind the first preset position, it is still necessary to take out the inventory item in the first preset position when an inventory item needs to be placed in the second preset position, thereby having a low efficiency.

In some other embodiments, alternatively, the method for retrieving an inventory item further includes:

Step 309: driving, by the telescopic arm, the manipulator to move to the first storage unit along the reference line.

Step 3010: driving, by the telescopic arm, the manipulator that is remained on the horizontal plane where the reference line is located, to load the first inventory item located on the first storage unit.

Step 3011: driving, by the telescopic arm, the manipulator loaded with the first inventory item to move to the second preset position of the warehouse shelf along the reference line.

Step 3012B: unloading, by the manipulator that is remained on the horizontal plane where the reference line is located, the first inventory item to the second preset position of the warehouse shelf.

The inventory items correspond to positions of the warehouse shelf one by one.

In some embodiments, the method for retrieving an inventory item further includes:

Step 3013: uploading current position information of the first inventory item.

Compared with the prior art, the present application provides a method for retrieving an inventory item based on a handling robot, where the handling robot includes: a storage frame; a material handling device installed on the storage frame and including a telescopic arm and a manipulator installed to the telescopic arm; the method for retrieving an inventory item includes: driving, by the telescopic arm, the manipulator to extend to a preset position of a warehouse shelf along a preset horizontal reference line; loading, by the manipulator that is remained on the reference line, the inventory item in the preset position; driving, by the telescopic arm, the manipulator loaded with the inventory item to move to the storage frame along the reference line, and unloading, by the manipulator that is remained on the reference line, the inventory item to the storage frame. By the above method, the inventory item can be moved to the storage frame along the preset horizontal reference line, the occupied space of the storage frame in the vertical direction is less and a larger number of inventory items can be loaded.

It should be understood that similar to AGVs (Automatic Guided Vehicles) in prior art, the handling robot (e.g., an automated vehicle) provided in embodiments of the present invention may include one or more processors and one or more memories as described above. The one or more processors may include at least one of a microprocessor, a micro control unit (MCU), a central processing unit (CPU), a graphics processing unit (GPU), a video processing unit (VPU), a digital signal processor (DSP), and a filed programmable gate array (FPGA). The one or more memories may include one or more nonvolatile memories and one or more volatile memories.

The one or more memories may store instructions (e.g., program codes) and the instructions can be executed by the one or more processors. Upon execution of these instructions by the one or more processors, the components (e.g., the movable chassis, the materials handling device, and/or the fork) of the handling robot may be controlled to perform the above-described method.

The one or more processors of the handling robot may include a processing unit or processor of the detection assembly, and a main controller of the handling robot.

In an embodiment, the processor or processing unit of the detection assembly may be integrated with a main controller (e.g., microprocessor, CPU, MCU, GPU, or VPU) of the handling robot, and the main controller is responsible for calculation or analysis of the position offsets (or angle deviation amount) based at least in part on input or inputs from one or more sensor (e.g., each or any combination of the camera, the laser sensor, the infrared sensor, and the radio frequency transmitter).

However, in some embodiments, the processor or processing unit of the detection assembly may be separate from the main controller of the handling robot. The processor or processing unit of the detection assembly may be used to make analysis or calculation of the position offsets (or angle deviation amount) based at least in part on the detected input or inputs. After calculation or analysis is done, the result of calculation or analysis may be sent from the detection assembly to the main controller of the handling robot so that the main controller of the handling robot is able to control components of the handling robot to move in one or more directions. The detection assembly may include one or more processors or processing units, however, it is not limited to the number of the processor or processing unit included in the detection assembly. In this way, the computational amount of the main controller can be reduced.

It should be understood the handling robot is an automated vehicle disposed within a facility. Compared with the prior art, it is not necessary for a driver to drive the vehicle. The handling robot is automatically controlled.

Finally, it should be noted that the above embodiments are only used to illustrate the technical solutions of the present application, not to limit them. The technical features in the above embodiments or different embodiments may also be combined.

The steps can be implemented in any order. For example, when the handling robot 100 transports the inventory item on the warehouse shelf to the temporary storage unit, the step 2 or step 3 may be performed before step 1, and the step 3 may be performed before step 2.

There are many other variations in different aspects of the present application as described above. For simplicity, they are not provided in detail; although the present application has been described in detail with reference to the aforementioned embodiments, a person having ordinary skill in the art should understand that they may still modify technical solutions described in the aforementioned embodiments, or equivalently replace some of the technical features; and these modifications or replacements do not make the essence of the corresponding technical solutions deviate from the scope of the technical solutions of the embodiments of the present application.

What is claimed is:

1. A handling robot, comprising:
a movable chassis;
a storage frame supported by the movable chassis, the storage frame being provided with a plurality of storage units;
a material handling device supported by the movable chassis and configured to move in a vertical direction, the material handling device being configured to transport an inventory item between a shelf and one of the plurality of storage units; and
a lifting assembly configured to drive the material handling device to move in the vertical direction;
wherein the material handling device comprises:
a support bracket configured to move in the vertical direction; and
a fork supported by the support bracket and configured to rotate around the vertical direction relative to the support bracket;
wherein the fork comprises:
a temporary storage unit configured to temporarily store the inventory item on an upper side of the temporary storage unit, the temporary storage unit being configured to support a weight of the inventory item;
a telescopic arm configured to extend or retract relative to the temporary storage unit, wherein the telescopic arm comprises a first arm section and a second arm section directly or indirectly connected to the first arm section, the first arm section being directly or indirectly coupled to the temporary storage unit, the second arm section being movable relative to the first arm section; and
a pusher assembly, wherein the pusher assembly comprises;
a push rod fixedly installed to the second arm section, the push rod being immovable relative to the second arm section, the push rod being configured to move together with the second arm section relative to the temporary storage unit, the push rod being configured to push the inventory item away from the temporary storage unit when the telescopic arm is in a state where the telescopic arm is in a process of extending relative to the temporary storage unit; and
a manipulator installed to the second arm section, the manipulator being configured to fold or unfold relative to the second arm section, the manipulator being configured to pull the inventory item to the temporary storage unit when the manipulator is in a state where the manipulator is unfolded relative to the second arm section and the telescopic arm is in a state where the telescopic arm is in a process of retracting relative to the temporary storage unit.

2. The handling robot according to claim 1, wherein the fork further comprises a U-shaped housing configured to house at least a part of the telescopic arm.

3. The handling robot according to claim 1, wherein the telescopic arm is configured to extend in a single direction relative to the temporary storage unit.

4. The handling robot according to claim 1, wherein the handling robot is configured to control the telescopic arm to extend based at least in part on a distance between the fork and the inventory item.

5. The handling robot according to claim 4, wherein the material handling device comprises a detection assembly configured to detect the distance;
wherein the detection assembly comprises at least one of a camera, a laser sensor, an infrared sensor, and a radio frequency transmitter.

6. The handling robot according to claim 1, wherein the telescopic arm is configured to extend so that an extension amount of the telescopic arm is larger than a distance between the fork and the inventory item.

7. The handling robot according to claim 1, wherein the material handling device further comprises a camera;
wherein the camera is directly or indirectly coupled to the temporary storage unit and is disposed beneath a surface of the temporary storage unit.

8. A handling robot, comprising:
a movable chassis comprising a base and a standing frame installed to the base;
a plurality of storage units supported by the movable chassis;
a material handling device configured to move along the standing frame, the material handling device being configured to transport an inventory item between a shelf and one of the plurality of storage units; and
a lifting assembly configured to drive the material handling device to move along the standing frame;
wherein the material handling device comprises:
a support bracket configured to move along the standing frame;
a fork installed to the support bracket and configured to rotate around a vertical direction relative to the support bracket; and
a camera;
wherein the fork comprises:
a temporary storage unit configured to temporarily store the inventory item on the temporary storage unit during transport of the inventory item;
a telescopic arm directly or indirectly coupled to the temporary storage unit, the telescopic arm being configured to extend or retract relative to the temporary storage unit in order to transport the inventory item; and
a pusher assembly installed to the telescopic arm and configured to push or pull the inventory item;
wherein the camera is directly or indirectly coupled to the temporary storage unit.

9. The handling robot according to claim 8, wherein the camera is configured to rotate together with the fork around the vertical direction relative to the support bracket when the fork is in a state where the fork is in a process of rotating.

10. The handling robot according to claim 8, wherein the camera is mounted beneath a surface of the temporary storage unit.

11. The handling robot according to claim 8, wherein the fork comprises a U-shaped housing provided with an opening, the telescopic arm being extendable in a single direction relative to the temporary storage unit;
wherein the camera is mounted to an end of the temporary storage unit, the end of the temporary storage unit being close to the opening.

12. The handling robot according to claim 8, wherein the camera is mounted in the middle of the temporary storage unit.

13. The handling robot according to claim 8, wherein a lens of the camera is in a direction the same or substantially the same as a direction of extension of the telescopic arm.

14. The handling robot according to claim 8, wherein the camera is immovable relative to the temporary storage unit.

15. The handling robot according to claim 8, wherein the telescopic arm is configured to extend so that an extension amount of the telescopic arm is larger than a distance between the fork and the inventory item.

16. The handling robot according to claim 8, wherein the telescopic arm comprises:
a first arm section directly or indirectly coupled to the temporary storage unit; and
a second arm section connected to the first arm section and configured to move relative to the first arm section;
wherein the pusher assembly comprises:
a push rod fixedly mounted to the second arm section and configured to push the inventory item away from the temporary storage unit, the push rod being immovable relative to the second arm section, the push rod being movable together with the second arm section relative to the temporary storage unit; and
a manipulator mounted to the second arm section, the manipulator being configured to fold or unfold relative to the second arm section, the manipulator being configured to pull the inventory item to the temporary storage unit.

17. The handling robot according to claim 8, wherein the material handling device is configured to transport the inventory item from the shelf to the one of the plurality of storage units, a marker being arranged on the shelf;
wherein the camera is configured to acquire an image of the marker arranged on the shelf;
wherein the handling robot is configured to control the material handling device to move along the standing frame based at least in part on a position offset so as to transport the inventory item from the shelf, the position offset reflecting a relative position between the material handling device and the inventory item in the vertical direction, the position offset being calculated based at least in part on the image of the marker.

18. The handling robot according to claim 8, wherein the material handling device is configured to transport the inventory item from the shelf to the one of the plurality of storage units;
wherein the camera is configured to acquire an image containing the inventory item;
wherein the handling robot is configured to control the movable chassis to move in a travelling direction based at least in part on a position offset reflecting a relative position between the material handling device and the inventory item in the travelling direction, the position offset being calculated based at least in part on the image.

19. The handling robot according to claim 8, wherein the camera is aligned with a central axis of the temporary storage unit.

20. The handling robot according to claim 8, wherein the telescopic arm comprises:
- a first arm section directly or indirectly coupled to the temporary storage unit; and
- a second arm section movably connected to the first arm section;
- wherein the pusher assembly comprises:
- a push rod fixedly mounted to the second arm section and configured to push the inventory item away from the temporary storage unit; and
- a manipulator mounted to the second arm section, the manipulator being configured to fold or unfold relative to the second arm section, the manipulator being configured to pull the inventory item to the temporary storage unit.

21. The handling robot according to claim 8, wherein the material handling device is configured to transport the inventory item from the shelf to the one of the plurality of storage units;
- wherein the camera is configured to acquire an image containing the inventory item;
- wherein the handling robot is configured to control the fork to rotate around the vertical direction based at least in part on an angle deviation amount between the material handling device and the inventory item;
- wherein the angle deviation amount is calculated based at least in part on the image.

22. A system for transporting an inventory item, the system comprising:
- a shelf, wherein the inventory item is placed on the shelf; and
- a handling robot configured to transport the inventory item from the shelf;
- wherein the handling robot comprises:
- a movable chassis comprising a base and a standing frame installed to the base, the movable chassis being configured to move to a position in front of the shelf;
- a material handling device configured to move along the standing frame to a preliminary height; and
- a lifting assembly configured to drive the material handling device to move along the standing frame;
- wherein the material handling device comprises a detection assembly configured to determine a position offset reflecting a relative position between the material handling device and the inventory item in a vertical direction;
- wherein the handling robot is configured to control the material handling device to move along the standing frame from the preliminary height based at least in part on the position offset;
- wherein the material handling device further comprises:
- a support bracket configured to move along the standing frame; and
- a fork installed to the support bracket and configured to rotate around the vertical direction relative to the support bracket, the fork comprising a U-shaped housing;
- wherein the fork further comprises:
- a temporary storage unit configured to temporarily store the inventory item during transport of the inventory item;
- a telescopic arm coupled to the temporary storage unit and configured to extend in a single direction relative to the temporary storage unit; and
- a pusher assembly installed to the telescopic arm:
- wherein the telescopic arm comprises:
- a first arm section directly or indirectly coupled to the temporary storage unit; and
- a second arm section directly or indirectly connected to the first arm section and configured to move relative to the first arm section;
- wherein the pusher assembly comprises:
- a push rod fixedly mounted to the second arm section and configured to push the inventory item away from the temporary storage unit, the push rod being immovable relative to the second arm section; and
- a manipulator mounted to the second arm section, the manipulator being configured to fold or unfold relative to the second arm section, the manipulator being configured to pull the inventory item to the temporary storage unit.

23. The system according to claim 22, wherein the material handling device is further configured to move along the standing frame from the preliminary height so that an update of the position offset is smaller than a predetermined value.

24. The system according to claim 22, further comprising a marker arranged on the shelf;
- wherein the detection assembly comprises a camera configured to acquire an image of the marker;
- wherein the position offset is calculated based at least in part on the image of the marker.

25. The system according to claim 24, wherein the marker comprises a two-dimensional code label.

26. The system according to claim 22, wherein the handling robot is configured to determine a relative position between the shelf and the inventory item.

27. The system according to claim 22, wherein the detection assembly comprises:
- a camera; and
- a processor, the processor comprising a built-in processing unit or a main controller of the handling robot.

28. A system for transporting an inventory item, comprising:
- a shelf, wherein the inventory item is placed on the shelf; and
- a handling robot configured to transport the inventory item from the shelf;
- wherein the handling robot comprises:
- a movable chassis comprising a base and a standing frame installed to the base, the movable chassis being configured to move to a position in front of the shelf;
- a material handling device configured to move along the standing frame to a preliminary height; and
- a lifting assembly configured to drive the material handling device to move along the standing frame;
- wherein the material handling device comprises a detection assembly configured to determine a position offset reflecting a relative position between the material handling device and the inventory item in a vertical direction;
- wherein the material handling device is further configured to move along the standing frame from the preliminary height in response to movement to the preliminary height, so that the position offset is smaller than a predetermined value;
- wherein the material handling device further comprises:
- a support bracket configured to move along the standing frame; and
- a fork installed to the support bracket and configured to rotate around the vertical direction relative to the support bracket, the fork comprising a U-shaped housing provided with an opening;

wherein the fork further comprises:

a temporary storage unit configured to temporarily store the inventory item during transport of the inventory item;

a telescopic arm coupled to the temporary storage unit and configured to extend in a single direction relative to the temporary storage unit; and a pusher assembly installed to the telescopic arm:

wherein the telescopic arm comprises a first arm section and a second arm section, the first arm section being coupled to the temporary storage unit, the second arm section being connected to the first arm section and configured to move relative to the first arm section;

wherein the pusher assembly comprises:

a push rod fixedly mounted to the second arm section and configured to push the inventory item, the push rod being immovable, relative to the second arm section; and a manipulator mounted to the second arm section, the manipulator being configured to fold or unfold relative to the second arm section, the manipulator being configured to pull the inventory item.

29. The system according to claim 28, further comprising a marker arranged on the shelf;

wherein the detection assembly comprises a camera configured to acquire an image of the marker;

wherein the position offset is calculated based at least in part on the image of the marker.

30. The system according to claim 29, wherein the marker comprises a two-dimensional code label.

\* \* \* \* \*

UNITED STATES PATENT AND TRADEMARK OFFICE
CERTIFICATE OF CORRECTION

PATENT NO. : 11,655,099 B2
APPLICATION NO. : 17/944671
DATED : May 23, 2023
INVENTOR(S) : Jui-chun Cheng, Shengdong Xu and Yuqi Chen It is certified that error appears in the above-identified patent and that said Letters Patent is hereby corrected as shown below:

In the Specification

At Column 23, Line 15:
"symmetrical axis 51" should be "symmetrical axis S1"

At Column 32, Line 40:
"Similarly, hi some, other embodiments;" should be "Similarly, in some other embodiments,"

In the Claims

At Column 38, Lines 50-51, Claim 1:
"wherein the pusher assembly comprises;" should be "wherein the pusher assembly comprises:"

At Column 42, Line 1, Claim 22:
The ":" after "telescopic arm" should be a ";"

At Column 43, Line 10, Claim 28:
The ":" after "telescopic arm" should be a ";"

At Column 43, Line 19, Claim 28:
The "," after "immovable" and before "relative to" should be removed Signed and Sealed this
Twenty-seventh Day of June, 2023

Katherine Kelly Vidal
*Director of the United States Patent and Trademark Office*